(12) United States Patent
Therriault et al.

(10) Patent No.: US 8,101,139 B2
(45) Date of Patent: *Jan. 24, 2012

(54) MICROCAPILLARY NETWORKS

(75) Inventors: Daniel Therriault, Rimouski (CA);
Jennifer A. Lewis, Urbana, IL (US);
Scott R. White, Champaign, IL (US)

(73) Assignee: Board of Trustees of University of Illinois, Urbana, IL (US)

( * ) Notice: Subject to any disclaimer, the term of this patent is extended or adjusted under 35 U.S.C. 154(b) by 551 days.

This patent is subject to a terminal disclaimer.

(21) Appl. No.: 12/133,606

(22) Filed: Jun. 5, 2008

(65) Prior Publication Data
US 2009/0000678 A1 Jan. 1, 2009

Related U.S. Application Data

(62) Division of application No. 11/558,084, filed on Nov. 9, 2006, now Pat. No. 7,799,251, which is a division of application No. 10/673,083, filed on Sep. 26, 2003, now abandoned.

(60) Provisional application No. 60/413,985, filed on Sep. 26, 2002.

(51) Int. Cl.
*B01L 3/00* (2006.01)

(52) U.S. Cl. .......................... 422/507; 264/49
(58) Field of Classification Search ............... 137/833; 264/49; 422/507
See application file for complete search history.

(56) References Cited

U.S. PATENT DOCUMENTS

| | | | |
|---|---|---|---|
| 2,892,797 A | 6/1959 | Alexander et al. | |
| 3,878,034 A | 4/1975 | Bever et al. | |
| 4,178,270 A | 12/1979 | Fujita | |
| 4,181,532 A | 1/1980 | Woodhead | |
| 4,410,457 A | 10/1983 | Fujimura et al. | |
| 4,414,354 A | 11/1983 | Slocombe | |
| 4,426,356 A | 1/1984 | Nair | |
| 4,446,174 A | 5/1984 | Maekawa et al. | |
| 4,471,100 A | 9/1984 | Tsubakimoto et al. | |
| 4,701,218 A | 10/1987 | Barker et al. | |
| 4,818,614 A | 4/1989 | Fukui et al. | |
| 4,824,593 A * | 4/1989 | Appel et al. | 510/347 |
| 4,946,904 A | 8/1990 | Akimoto et al. | |
| 4,960,465 A | 10/1990 | Arfaei | |
| 5,021,596 A | 6/1991 | Barfurth et al. | |
| 5,100,984 A | 3/1992 | Burge et al. | |

(Continued)

FOREIGN PATENT DOCUMENTS

AU B-64095/80 9/1982

(Continued)

OTHER PUBLICATIONS

"The Oxford Desk Dictionary American Edition" Edited by Laurence Urdang; p. 191; Published 1995.*

(Continued)

*Primary Examiner* — Craig Schneider
(74) *Attorney, Agent, or Firm* — Brinks Hofer Gilson & Lione

(57) ABSTRACT

Devices that include hosts having internal microcapillary networks are disclosed. The microcapillary networks are formed from interconnected passageways. The interconnected passageways may be formed by removing a fugitive material from a cured host material that forms the host. The resultant host material has many applications, including use as a microfluidic device in applications ranging from fluid mixing to structural repair.

25 Claims, 20 Drawing Sheets

U.S. PATENT DOCUMENTS

| | | |
|---|---|---|
| 5,147,841 A | 9/1992 | Wilcoxon |
| 5,196,199 A | 3/1993 | Fuisz |
| 5,237,017 A | 8/1993 | Akiyama et al. |
| 5,238,625 A | 8/1993 | Sakurai et al. |
| 5,250,476 A | 10/1993 | Mogensen et al. |
| 5,284,894 A | 2/1994 | Wasyliw et al. |
| 5,344,487 A | 9/1994 | Whalen-Shaw |
| 5,369,198 A | 11/1994 | Albrecht et al. |
| 5,393,343 A | 2/1995 | Darwin et al. |
| 5,416,071 A | 5/1995 | Igari et al. |
| 5,424,362 A | 6/1995 | Hwang et al. |
| 5,424,364 A | 6/1995 | Simms et al. |
| 5,424,466 A | 6/1995 | Stern et al. |
| 5,424,467 A | 6/1995 | Bam et al. |
| 5,424,477 A | 6/1995 | Higuchi et al. |
| 5,429,761 A | 7/1995 | Havelka et al. |
| 5,516,836 A | 5/1996 | Sauer et al. |
| 5,545,280 A | 8/1996 | Wenz |
| 5,556,460 A | 9/1996 | Berke et al. |
| 5,597,871 A | 1/1997 | Auschra et al. |
| 5,607,892 A | 3/1997 | Chopin et al. |
| 5,643,247 A | 7/1997 | Fernandez et al. |
| 5,646,200 A | 7/1997 | Duncan |
| 5,651,986 A | 7/1997 | Brem et al. |
| 5,654,006 A | 8/1997 | Fernandez et al. |
| 5,665,158 A | 9/1997 | Darwin et al. |
| 5,753,037 A | 5/1998 | Drs et al. |
| 5,753,261 A | 5/1998 | Fernandez et al. |
| 5,800,922 A | 9/1998 | Anderson et al. |
| 5,811,124 A | 9/1998 | Fernandez et al. |
| 5,820,879 A | 10/1998 | Fernandez et al. |
| 5,883,196 A | 3/1999 | Rath et al. |
| 5,891,313 A | 4/1999 | Johnson et al. |
| 5,957,828 A | 9/1999 | Hayashi |
| 5,958,858 A | 9/1999 | Bettiol et al. |
| 5,962,608 A | 10/1999 | Ryang et al. |
| 6,008,181 A | 12/1999 | Cripe et al. |
| 6,015,781 A | 1/2000 | Vinson et al. |
| 6,020,303 A | 2/2000 | Cripe et al. |
| 6,027,326 A | 2/2000 | Cesarano, III et al. |
| 6,051,636 A | 4/2000 | Johnson et al. |
| 6,060,443 A | 5/2000 | Cripe et al. |
| 6,080,216 A | 6/2000 | Erickson |
| 6,093,856 A | 7/2000 | Cripe et al. |
| 6,103,868 A | 8/2000 | Heath et al. |
| 6,107,409 A | 8/2000 | Hogan et al. |
| 6,127,094 A | 10/2000 | Victor et al. |
| 6,133,222 A | 10/2000 | Vinson et al. |
| 6,133,227 A | 10/2000 | Barnabas et al. |
| 6,136,333 A | 10/2000 | Cohn et al. |
| 6,136,428 A | 10/2000 | Truong et al. |
| 6,136,769 A | 10/2000 | Asano et al. |
| 6,139,623 A | 10/2000 | Darwin et al. |
| 6,150,459 A | 11/2000 | Mayes et al. |
| 6,153,577 A | 11/2000 | Cripe et al. |
| 6,165,406 A | 12/2000 | Jang et al. |
| 6,167,910 B1 | 1/2001 | Chow |
| 6,207,749 B1 | 3/2001 | Mayes et al. |
| 6,211,249 B1 | 4/2001 | Cohn et al. |
| 6,228,829 B1 | 5/2001 | Vinson et al. |
| 6,242,406 B1 | 6/2001 | Katsuda et al. |
| 6,258,161 B1 | 7/2001 | Kerkar et al. |
| 6,262,129 B1 | 7/2001 | Murray et al. |
| 6,277,191 B1 | 8/2001 | Budiansky et al. |
| 6,321,791 B1 | 11/2001 | Chow |
| 6,379,974 B1 | 4/2002 | Parce et al. |
| 6,395,804 B1 | 5/2002 | Rao et al. |
| 6,436,167 B1 | 8/2002 | Chow et al. |
| 6,441,054 B1 | 8/2002 | Ou et al. |
| 6,451,433 B1 | 9/2002 | Oka et al. |
| 6,465,257 B1 | 10/2002 | Parce et al. |
| 6,471,761 B2 | 10/2002 | Fan et al. |
| 6,499,499 B2 | 12/2002 | Dantsker et al. |
| 6,517,199 B1 | 2/2003 | Tomioka et al. |
| 6,572,673 B2 | 6/2003 | Lee et al. |
| 6,595,232 B2 | 7/2003 | Guzman et al. |
| 6,596,545 B1 | 7/2003 | Wagner et al. |
| 6,599,647 B2 | 7/2003 | Oguri et al. |
| 6,645,444 B2 | 11/2003 | Goldstein |
| 6,670,415 B2 | 12/2003 | Jardine et al. |
| 6,673,285 B2 | 1/2004 | Ma |
| 6,746,510 B2 | 6/2004 | Kurihara et al. |
| 6,861,205 B2 | 3/2005 | Bowman et al. |
| 6,878,184 B1 | 4/2005 | Rockenberger et al. |
| 6,929,675 B1 | 8/2005 | Bunge et al. |
| 6,942,825 B2 | 9/2005 | Honda et al. |
| 6,974,493 B2 | 12/2005 | Harutyunyan et al. |
| 7,053,125 B2 | 5/2006 | Lewis et al. |
| 7,081,322 B2 | 7/2006 | Ray et al. |
| 7,141,617 B2 | 11/2006 | Gratson et al. |
| 7,160,525 B1 | 1/2007 | Peng et al. |
| 7,198,736 B2 | 4/2007 | Kasuga et al. |
| 2001/0049912 A1 | 12/2001 | Motonari et al. |
| 2002/0015846 A1 | 2/2002 | Evans et al. |
| 2002/0016387 A1 | 2/2002 | Shen |
| 2002/0121229 A1 | 9/2002 | Jardine et al. |
| 2002/0147282 A1 | 10/2002 | Mayes et al. |
| 2002/0182171 A1 | 12/2002 | Detert et al. |
| 2002/0195747 A1 | 12/2002 | Hull et al. |
| 2003/0032727 A1 | 2/2003 | Narayan-Sarathy et al. |
| 2003/0091647 A1 | 5/2003 | Lewis et al. |
| 2003/0162004 A1 | 8/2003 | Mirkin et al. |
| 2003/0177690 A1 | 9/2003 | Wittkowski et al. |
| 2004/0076822 A1 | 4/2004 | Jagota et al. |
| 2004/0096469 A1 | 5/2004 | Lewis et al. |
| 2004/0161544 A1 | 8/2004 | Kasperchik |
| 2004/0226620 A1 | 11/2004 | Therriault et al. |
| 2005/0004261 A1 | 1/2005 | Yatake |
| 2005/0189520 A1 | 9/2005 | Okada et al. |
| 2005/0196605 A1 | 9/2005 | Ramsey |
| 2006/0235105 A1 | 10/2006 | Gratson et al. |
| 2006/0239902 A1 | 10/2006 | Kimura et al. |
| 2007/0172588 A1 | 7/2007 | Therriault et al. |
| 2007/0228335 A1 | 10/2007 | Gratson et al. |
| 2008/0245266 A1 | 10/2008 | Lewis et al. |
| 2009/0000678 A1 | 1/2009 | Therriault et al. |

FOREIGN PATENT DOCUMENTS

| | | |
|---|---|---|
| DE | 2052749 | 5/1972 |
| EP | 362770 A2 | 4/1990 |
| EP | 0 263 490 B1 | 1/1995 |
| GB | 2094820 A | 9/1982 |
| GB | 0525788.6 | 7/2007 |
| WO | WO 97/19711 A1 | 6/1997 |
| WO | WO 99/51335 | 10/1999 |
| WO | WO 00/47628 A | 8/2000 |
| WO | WO 01/89787 A2 | 11/2001 |
| WO | WO 02/20627 A | 3/2002 |
| WO | WO/2004/043853 | 5/2004 |
| WO | PCT/US2004/018353 | 12/2004 |
| WO | WO 2005/000977 | 1/2005 |
| WO | PCT/US2004/018353 | 1/2006 |

OTHER PUBLICATIONS

Duoss, E.B. et al, "Sol-gel inks for direct-write assembly of functional oxides", Adv. Mater, vol. 19, pp. 3485-3489, (2007).

Su, Ming et al., "Moving beyod Molecules: Patterning Solid-State Features via Dip-Pen Nanolithography with Sol-Based Inks", J. Am. Chem. Soc., vol. 124, No. 8, pp. 1560-1561, (2002).

Technical Bulletin: Pluronic P123 Block Copolymer Surfactant, BASF, 1 page, (2004).

Pierre, A.C., "Introduction to Sol-Gel Processing", Kluwer Academic Publishers, Boston, pp. 2-3, (1998).

Xu, P. "Polymer-ceramic nanocomposites: Ceramic phases", Encyclopedia of Materials: science and Technology, pp. 1-6, Pergamon Press, (2001).

Caracoche, et al., "Zirconium oxide structures prepared by the sol-gel route: 1, The role of the alcoholic solvent", Journal of the American Ceramics Society, vol. 83, No. 2, pp. 377-384, (2000).

Weeks, E.R. et al., "Three-Dimensional Direct Imaging of Structural Relaxation Near the Colloidal Glass Transition", Science, vol. 287, pp. 627-631, (2000).

Manley, S. et al., "Glasslike Arrest in Spinodal Decomposition as a Route to Colloidal Gelation", Phys. Rev. Lett., 95, Art. No. 238302, pp. 238302-1 thru 23802-4, (2005).

Trappe, V. et al., "Jamming phase diagram for attractive particles", Nature, vol. 411, pp. 772-775, (2001).
Anderson, V.J. et al., "Insights into phase transition kinetics from colloid science", Nature, vol. 416, pp. 811-815, (2002).
Lewis, J.A., Colloidal Processing of Ceramics. J. Am. Ceram. Soc., 83, (10), pp. 2341-2359, (2000).
Martinez, C.J. et al., "Shape Evolution and Stress Development During Latex-Silica Film Formation", Langmuir, 18, pp. 4689-4698, (2002).
Fichtner, M. et al., "Small Ti clusters for catalysis of hydrogen exchange in NaAIH4. Nanotechnology", 14, (7), pp. 778-785, (2003).
Kim, A.S. et al, "Cake resistance of aggregates formed in the diffusion-limited-cluster-aggregation (DLCA) regime", J. Membrane Science, 286, pp. 260-268, (2006).
Weitz, D.A. et al., "Fractal Structures Formed by Kinetic Aggregation of Aqueous Gold Colloids", Phys. Rev. Lett., 52, pp. 1433-1436, (1984).
Carpineti, M. et al., "Transition from Semiorder to Disorder in the Aggregation of Dense Colloidal Solutions", Phys. Rev. Lett., 70, (24), pp. 3828-3830, (1993).
Chen, M. et al., "Characteristics of Flocculated Silica Dispersions", J. Colloid Interface Sci., 141, pp. 564-577, (1991).
Varadan, P. et al., "Direct visualization of long range structural heterogeneity in colloidal gels", Langmuir, 19, pp. 509-512 (2003).
Hütter, M., "Local Structure Evolution in Particle Network Formation Studied by Brownian Dynamics Simulation", J. Colloid and Interface Sci., 231, pp. 337-350, (2000).
Dinsmore, A.D. et al., "Microscopic Structure and Elasticity of Weakly Aggregated Colloidal Gels", Phys. Rev. Lett., 96, Art. No. 185502, pp. 185502-1 thru 185502-4, (2006).
Ramakrishnan, S. et al. "Microstructure and Rheology of Thermoreversible Nanoparticle Gels", Langmuir, 22, pp. 7833-7842, (2006).
Ramakrishnan, S. et al., "Clustering and mechanics in dense depletion and thermal gels", Langmuir, 21, pp. 9917-9925, (2005).
Chung, B. et al. "Microscopic Dynamics of Recovery in Sheared Depletion Gels", Phys. Rev. Lett., 96, Art. No. 228301, pp. 228301-1 thru 228301-4, (2006).
Krell, A.H. et al., "Internal Dynamics and Elasticity of Fractal Colloidal Gels", Phys. Rev. Lett., 80, (4), pp. 778-781, (1998).
Weeks, E.R. et al., "Properties of cage rearrangements observed near the colloidal glass transition", Phys. Rev. Lett., 89, (Art. No. 095704), pp. 095704-1 thru 095704-4, (2002).
Puertas, A.M. et al., "Dynamical heterogeneities close to a colloidal gel", J. Chem. Phys., 121, (6), pp. 2813-2822, (2004).
Puertas, A.M. et al., "Mode Coupling and Dynamical Heterogeneity in Colloidal Gelation A Simulation Study", J. Phys. Chem. B, 109, pp. 6666-6675, (2005).
Kegel, W.K. et al., "Direct Observation of Dynamical Heterogeneities in Colloidal Hard-Sphere Suspensions", Science, 287, pp. 290-293, (2000).
Crocker, J.C., "Methods of Digital Video Microscopy for Colloidal Studies", J. Colloid and Interface Sci., 179, pp. 298-310, (1996).
Dinsmore, A.D. et al., "Direct imaging of three-dimensional structure and topology of colloidal gels", J. Phys. Cond. Matter, 14, pp. 7581-7597, (2002).
Dibble, C.J. et al., "Structure and dynamics of colloidal depletion gels: Coincidence of transitions and heterogeneity", Phys. Rev. E., 74, Art. No. 041403, pp. 041403-1 thru 041403-11 (2006).
Leunissen, M.E. et al. "Ionic colloidal crystals of oppositely charged particles", Nature, 437, (8), pp. 235-240, (2005).
Van Blaaderen, A. et al., "Template-directed colloidal crystallization", Nature, 385, pp. 321-324, (1997).
Lee, W. et al., "Nanoparticle-Mediated Epitaxial Assembly of Colloidal Crystals on Patterned Substrates", Langmuir, 20, pp. 5262-5270, (2004).
Solomon, T. et al., "Stacking fault structure in shear-induced colloidal crystallization", J. Chem Phys., 124, Art. No. 134905, pp. 134905-1 thru 134905-10, (2006).
Schall, P. et al., "Visualization of Dislocation Dynamics in Colloidal Crystals", Science, 305, pp. 1944-1948, (2004).

Mohraz, A. et al., "Direct Visualization of Colloidal Rod Assembly by Confocal Microscopy", Langmuir, 21, pp. 5298-5306, (2005).
Pham, K.N. et al., "Multiple Glassy States in a Simple Model System", Science, 296, pp. 104-106, (2002).
Segre, P.N.; "Glasslike kinetic arrest at the colloidal-gelation transition", Phys. Rev. Lett., 86, (26), pp. 6042-6045, (2001).
Scheidler, P. et al., "Cooperative motion and growing length scales in supercooled confined liquids", Europhys. Letters, 59 (5), pp. 701-707, (2002).
Kim, K. et al., "Apparent finite-size effects in the dynamics of supercooled liquids", Phys. Rev. E, 61, (1), pp. R41-R44, (2000).
Malek, K. et al., "Effects of surface roughness on self- and transport diffusion in porous media in the Knudsen regime", Phys. Rev. Lett., 87, (12), Art. No. 125505, pp. 125505-1 thru 125505-4, (2001).
Elimelech, M. et al., "Kinetics of Deposition of Colloidal Particles in Porous Media", Environmental Science and Technology, 24, pp. 1528-1536, (1990).
Bogush, G.H. et al., "Preparation of monodisperse silica particles: Control of size and mass fraction", Journal of Non-Crystalline Solids, 104, pp. 95-106, (1988).
van Blaaderen, A. et al., "Synthesis and Characterization of Colloidal Dispersions of Fluorescent, Monodisperse Silica Spheres", Langmuir, 8, pp. 2921-2931, (1992).
Dinsmore, A.D. et al. "Three-dimensional confocal microscopy of colloids", Appl. Opt., 40, (24), pp. 4152-4159, (2001).
Baxter, R.J., "Percus-Yevick equation for hard spheres with surface adhesion", J. Chem. Phys. 49, pp. 2770-2774, (1968).
Shih, W-H, et al., "Scaling behavior of the elastic properties of colloidal gels", Phys. Rev. A, 42, (8), pp. 4772-4779, (1990).
de Rooij, R. et al., "Elasticity of weakly aggregating polystyrene latex dispersions", Phys. Rev. E, 49, (4), pp. 3038-3049, (1994).
Potanin, A.A. et al., "Microrheological modeling of weakly aggregated dispersions", J. Chem. Phys., 102, (14), pp. 5845-5853, (1995).
Wolthers, W. et al. "Linear viscoelastic behavior of aggregated colloidal dispersions", Phys. Rev. E, 56, (5), pp. 5726-5733, (1997).
Mellema, M. et al., "Categorization of rheological scaling models for particle gels applied to casein gels", J. Rheol., 46, (1), pp. 11-29, (2002).
Mohraz, A. et al, "Orientation and rupture of fractal colloidal gels during start-up of steady shear flow", J. Rheology, 49, (3), pp. 657-681, (2005).
Eckert, T. et al., "Re-entrant Glass Transition in a Colloid-Polymer Mixture with Depletion Attractions", Phys. Rev. Lett., 89, (12), Art. No. 125701, pp. 125701-1 thru 125701-4, (2002).
Kirby H.K. et al., "Poly(acrylic acid)-poly(ethylene oxide) comb polymer effects on BaTiO3 nanoparticle suspension stability", J. Am. Ceram. Soc., 87, (2), pp. 181-186, (2004).
Li,Q. et al., "Nanoparticle inks for directed assembly of three-dimensional periodic structures", Adv. Mater., 15, (19), pp. 1639-1643, (2003).
Zukoski C.F., "Material properties and the electrorheological response", Annu. Rev. Mater. Sci., 23, pp. 45-78, (1993).
Lewis, J.A. et al., "Direct Ink Writing of Three-Dimensional Ceramic Structures", J. Am. Ceram. Soc., 89 [12], pp. 3599-3609, (2006).
Mohraz, A. et al., "Structure and Dynamics of Biphasic Colloidal Mixtures", Phys. Rev. E, 77, Art No. 060403(R), pp. 060403-1 thru 060403-4, (2008).
Croucher, M. et al., "Selective Flocculation in Heterosterically Stabilised Nonaqueous Dispersions", Colloids and Surfaces, 1, pp. 349-360, (1980).
Rao, R. et al., Abstract of Biphasic Nanoparticle Inks for the Direct Writing of 3D Ceramic Structures, Department of Materials Science and Engineering, Univer. of Ill. at Urbana-Champaign, 1 page, (2006).
Whitby, C.P. et al., "PAA/PEO comb polymer effects on rheological properties and interparticle forces in aqueous silica suspensions", J. of Colloid and Interface Science, 262, pp. 274-281, (2003).
Lewis, J.A. et al., "Direct writing in three dimensions", Materials Today, pp. 32-39, (2004).
Duoss, E.B. et al., "Sol-Gel Inks for Direct-Write Assembly of Functional Oxides", Advanced Materials, 19, pp. 3485-3489, (2007).

Ryu, B-H. et al., "Synthesis of highly concentrated silver nanosol and its application to inkjet printing", Colloids and Surfaces A: Physicochem. Eng. Aspects, 270-71, pp. 345-351, (2005).

Xu, X. et al., "γ-Radiation synthesis of poly(acrylic acid)-metal nanocomposites", Materials Letters, 37, pp. 354-358, (1998).

Magdassi, S. et al., "Silver Nanoparticles as Pigments for Water-Based Ink-Jet Inks", Chem. Mater., 15, pp. 2208-2217, (2003).

Wang, W. et al., "Silver Nanoparticles Capped by Long-Chain Unsaturated Carboxylates", J. Phys. Chem. B, 103, pp. 7238-7246, (1999).

Jana, N. R. et al., "Single-Phase and Gram-Scale Routes toward Nearly Monodisperse Au and Other Noble Metal Nanocrystals", J. Am. Chem. Soc., 125, pp. 14280-14281, (2003).

Lin, X.Z. et al. "Direct Synthesis of Narrowly Dispersed Silver Nanoparticles Using a Single-Source Precursor", Langmuir, 19, pp. 10081-10085, (2003).

Wu, R-T. et al., "Preparation of highly concentrated and stable suspensions of silver nanoparticles by an organic base catalyzed reduction reaction", Materials Research Bulletin, 43, pp. 1276-1281, (2008).

Yamamoto, M. et al., "Size-Controlled Synthesis of Monodispersed Silver Nanoparticles Capped by Long-Chain Alkyl Carboxylates from Silver Carboxylate and Tertiary Amine", Langmuir, 22, pp. 8581-8586, (2006).

Fuller, S.B. et al., "Ink-Jet Printed Nanoparticle Microelectromechanical Systems", Journal of Microelectromechanical Systems, 11, pp. 54-60, (2002).

Kim, D. et al., "Direct writing of silver conductive patterns: Improvement of film morphology and conductance by controlling solvent compositions", Applied Physics Letters, 89, pp. 264101-1 thru 264101-3, (2006).

Perelaer, J. et al., "Ink-jet Printing and Microwave Sintering of Conductive Silver Tracks", Advanced Materials, 18, pp. 2101-2104, (2006).

Moon, K-S. et al., "Thermal Behavior of Silver Nanoparticles for Low-Temperature Interconnect Applications", J. Electronic Materials, 34, pp. 168-175, (2005).

Chou, K-S. et al., "Fabrication and sintering effect on the morphologies and conductivity of nano-Ag particle films by the spin coating method", Nanotechnology, 16, pp. 779-784, (2005).

Jones, J. et al., "Stretchable Wavy Metal Interconnects", J. Vacuum Sci. Technol. A, 22, pp. 1723-1725, (2004).

Khang, D-Y. et al., "A Streatchable Form of Single-Crystal Silicon for High Performance Electronics on Rubber Substrates", Science, 311, pp. 208-212, (2006).

Shiraishi, Y. et al., "Oxidation of ethylene catalyzed by colloidal dispersions of poly(sodium acrylate)-protected silver nanoclusters", Colloids and Surfaces A: Physicochemical and Engineering Aspects, 169, pp. 59-66, (2000).

Chapman, R. et al., "Electro-optical shifts in silver nanoparticle films", Chemical Physics Lett., 349, pp. 358-362, (2001).

Pastoniza-Santos, I. et al., "Formation and Stabilization of Silver Nanoparticles through Reduction by N,N-Dimethylformamide", Langmuir, 15, pp. 948-951, (1999).

Cliffel, D.E. et al., "Mercaptoammonium-Monolayer-Protected, Water-Soluble Gold, Silver, and Palladium Clusters", Langmuir, 16, pp. 9699-9702, (2000).

Kuo, P-L. et al., "Formation of Silver Nanoparticles under Structured Amino Groups in Pseudo-dendritic Poly(allylamine) Derivatives", J. Phys. Chem. B, 107, pp. 11267-11272, (2003).

Pal, T. et al., "Reversible Formation and Dissolution of Silver Nanoparticles in Aqueous Surfactant Media", Langmuir, 13, pp. 1481-1485, (1997).

Prasad, B.L.V. et al., "Solvent-Adaptable Silver Nanoparticles", Langmuir, 21, pp. 822-826, (2005).

Chang, J.S. et al., "Optimization of Nanosized Silver Particle Synthesis via Experimental Design", Ind. Eng. Chem. Res., 46, pp. 5591-5599, (2007).

Pyatenko, A. et al., "Synthesis of Spherical Silver Nanoparticles with Controllable Sizes in Aqueous Solutions", J. Phys. Chem. C, 111, pp. 7910-7917, (2007).

Slistan-Grijalva, A. et al., "Synthesis of silver nanoparticles in a polyvinylpyrrolidone (PVP) paste, and their optical properties in a film and in ethylene glycol", Materials Research Bulletin, 43, pp. 90-96, (2008).

Park, J-U. et al., "High-resolution electrohydrodynamic jet printing", Nature Materials, 6, pp. 782-789, (2007).

Gratson, G.M. et al., "Direct writing of three-dimensional webs", Nature, 428, p. 386, (2004).

Toshima, N. et al., "Effect of additional metal ions on catalyses of polymer-stabilized metal nanoclusters", J. of Molecular Catalysis A: Chemical, 177, pp. 139-147, (2001).

U.S. Appl. No. 10/463,834, mailed Nov. 17, 2005.
U.S. Appl. No. 10/463,834, mailed Jul. 17, 2006.
U.S. Appl. No. 11/560,610, mailed Apr. 27, 2009.
U.S. Appl. No. 11/560,610, mailed Aug. 10, 2009.
U.S. Appl. No. 10/126,941, mailed Aug. 28, 2003.
U.S. Appl. No. 10/126,941, mailed Jun. 4, 2004.
U.S. Appl. No. 10/126,941, mailed Feb. 25, 2005.
U.S. Appl. No. 10/126,941, mailed Sep. 15, 2005.
U.S. Appl. No. 10/126,941, mailed Apr. 19, 2006.
U.S. Appl. No. 10/126,941, mailed Dec. 29, 2006.
U.S. Appl. No. 10/126,941, mailed Apr. 5, 2007.
U.S. Appl. No. 10/126,941, mailed May 14, 2007.
U.S. Appl. No. 10/126,941, mailed Jan. 25, 2008.
U.S. Appl. No. 10/336,636, mailed Mar. 14, 2005.
U.S. Appl. No. 10/336,636, mailed May 31, 2005.
U.S. Appl. No. 10/336,636, mailed Oct. 14, 2005.
U.S. Appl. No. 11/733,067, mailed Apr. 29, 2008.
U.S. Appl. No. 11/733,067, mailed Dec. 15, 2008.
U.S. Appl. No. 11/733,067, mailed Apr. 21, 2009.
U.S. Appl. No. 11/733,067, mailed Jul. 20, 2009.
U.S. Appl. No. 10/673,083, mailed Apr. 14, 2006.
U.S. Appl. No. 10/673,083, mailed Jun. 13, 2006.
U.S. Appl. No. 11/558,084, mailed Oct. 15, 2008.
U.S. Appl. No. 11/588,084, mailed May 14, 2009.
U.S. Appl. No. 10/588,084, mailed Oct. 15, 2006.

ADVA® Flow Superplasticizer ASTM C494, Type F (carboxylated polyether) with Material Safety Data Sheet (MSDS), Grace Construction Products 10 p., 2002.

Bell, Nelson, et al., "Cation-Induced Collapse of Low-Molecular-Weight Polyacrylic Acid in the Dispersion of Barium Titanate", Journal of Colloid and Interface Science, 254, pp. 296-305, 2002.

Berg, J.M., et al., "Interactions between Mica Surfaces in Sodium Polyacrylate Solutions Containing Calcium Ions", Journal of Colloid and Interface Science, 161, pp. 182-189, 1993.

Breitenbach, A., et al. "Branched biodegradable polyesters for parenteral drug delivery systems", Journal of Controlled Release, vol. 64, pp. 167-178, 2000.

Campbell, et al., "Fabrication of Photonic Crystals for the Visible Spectrum by Holographic Lithography," Nature, pp. 53-56, vol. 404, 2000.

Caruso et al., "Nanoengineering of Inorganic and Hybrid Hollow Spheres by Colloidal Templating," Science, pp. 1111-1114, vol. 282, 1998.

Cassagneau et al., "Conjugated Polymer Inverse Opals for Potentiometric Biosensing," Adv. Mater., pp. 1837-1841, vol. 14, 2002.

Cesarano III, Joseph et al., "Processing of Highly Concentrated Aqueous α-Alumina Suspensions Stabilized with Polyelectrolytes", J. Am. Ceram. Soc., vol. 71 No. 12, pp. 1062-1067, 1988.

Cesarano III, Joseph, et al., "Stability of Aqueous α-$Al_2O_3$ Suspensions with Poly(methacrylic acid) Polyelectrolyte", J. Am. Ceram. Soc., vol. 71, No. 4, pp. 250-255, 1988.

Chen et al., "Geometric Control of Cell Life and Death," Science, pp. 1425-1428, vol. 276, 1997.

Abstract of Sakai et al., "Influence of various types of inorganic salts on dispersion mechanisms of comb-type polymer containing grafted polyethylene oxides chains," Journal of the Ceramic Society of Japan, vol. 108, No. 10, pp. 904-908, 2000.

Chrisey et al., "Materials Processing: The Power of Direct Writing," Science, vol. 289, pp. 879-881, 2000.

Clark et al., "Creating Microstructures of Luminescent Organic Thin Films Using Layer-by-Layer Assembly," Adv. Mater., pp. 1031-1035, vol. 11, 1999.

Cumpston et al., "Two-Photon Polymerization Initiators for Three-Dimensional Optical Data Storage and Microfabrication," Nature, pp. 51-54, vol. 398, 1999.

Dahlgren, M., "Effect of Counterion Valency and Ionic Strength on Polyelectrolyte Adsorption" Langmuir vol. 10, No. 5, pp. 1580-1583, 1994.

De L. Costello, et al., "Experimental investigations of the interaction forces in concentrated dispersions", Colloids and Surfaces A: Physiochemical and Engineering Aspects, 77, pp. 55-63, 1993.

Decher, "Fuzzy Nanoassemblies: Toward Layered Polymeric Multicomposites," Science, pp. 1232-1237, vol. 277, 1997.

Demers et al., "Direct Patterning of Modified Oligonucleotides on Metals and Insulators by Dip-Pen Nanolithography," Science, pp. 1836-1838, vol. 296, 2002.

Feiertag et al., "Fabrication of Photonic Crystals by Deep X-Ray Lithography," Appl. Phys. Lett., pp. 1441-1443, vol. 71, 1997.

Fery et al., "Nanoporous Thin Films Formed by Salt-Induced Structural Changes in Multilayers of Poly(acrylic Acid) and Poly(allylamine)," Langmuir, pp. 3779-3783, vol. 17, 2001.

Foresi et al., "Photonic-Bandgap Microcavities in Optical Waveguides," Nature, pp. 143-145, vol. 390, 1997.

Hadjichristidis, N., "Polymers with Complex Architecture by Living Anionic Polymerization", Chem. Rev. vol. 101, pp. 3747, 3771-3775, 2001.

Jacoby, Mitch, 3-D Structures From Stable Gels:, Chemical & Engineering News, vol. 80, No. 26, p. 7, Jul. 1, 2002.

Jiang et al., "Exploring the Rules for Selective Deposition: Interactions of Model Polyamines on Acid and Oligoethylene Oxide Surfaces," Langmuir, pp. 1131-1143, vol. 18, 2002.

Jiang et al., "Polymer-On-Polymer Stamping: Universal Approaches to Chemically Patterned Surfaces," Langmuir, pp. 2607-2615, vol. 18, 2002.

Kenny, Jack, "Digital Printing: The Excitement Grows", www.labelandnarrowweb.com, pp. 1-5, Nov. 2000.

Kenny, Jack, "Specialty Ink", www.labelandnarrowweb.com, pp. 1-4, Sep. 2003.

Kiriy et al., "Cascade of Coil-Globule Conformational Transitions of Single Flexible Polyelectrolyte Molecules in Poor Solvent," J. Am. Chem. Soc., pp. 13454-13462, vol. 124, 2002.

Laarz, E. et al., "The Effect of Anionic Polyelectrolytes on the Properties of Aqueous Silicon Nitride Suspensions", Journal of the European Ceramic Society, vol. 20, pp. 431-440, 2000.

Label & Narrow Web, "Specialty Inks", pp. 1-14., Nov. 2000.

Landers et al., "Rapid Prototyping of Scaffolds Derived from Thermoreversible Hydrogels and Tailored for Applications in Tissue Engineering," Biomaterials, pp, 4437-4447, vol. 23, 2002.

Lazaris et al., "Spider Silk Fibers Spun from Soluble Recombinant Silk Produced in Mammalian Cells," Science, pp. 472-476, vol. 295, 2002.

Lee et al., "Multi-Photon Polymerization of Waveguide Structures Within Three-Dimensional Photonic Crystals," Adv. Mater., pp. 271-274, vol. 14, 2002.

Lewis, "Direct-Write Assembly of Ceramics from Colloidal Inks," Curr. Opin. Solid State Mat. Sci., pp. 245-250, vol. 6, 2002.

Li, C., et al., "Effect of a comb-like amphiphilic polymer on the stability of alumina dispersions", Colloids and Surfaces, 69, pp. 155-158, 1992.

Li, Chia-Chen, et al., "Interaction between Dissolved Ba2+ and PAA-NH4 Dispersant in Aqueous Barium Titanate Suspensions", Journal of the American Ceramic Society, vol. 85, No. 6, pp. 1449-1455, 2002.

Lin et al., "A Three-Dimensional Photonic Crystal Operating at Infrared Wavelengths," Nature, pp. 251-253, vol. 394, 1998.

Meier-Haack et al., "Pervaporation Separation of Water/Alcohol Mixtures Using Composite Membranes Based on Polyelectrolyte Multilayer Assemblies," J. Membr. Sci., pp. 233-243, vol. 184, 2001.

Napper, Donald H., "Polymeric Stabilization of Colloidal Dispersions" Academic Press, Inc., pp. 28-30, 1983.

Noda et al., "Full Three-Dimensional Photonic Bandgap Crystals at Near-Infrared Wavelengths," Science, pp. 604-606, vol. 289, 2000.

Orgeret-Ravanat, C. et al., "Adsorption/Desorption of a PEO-rich Comb-like Polymer at a Silica/Aqueous Solution Interface", Colloids and Surfaces vol. 33, pp. 109-119, 1988.

Piner et al., "Dip-Pen" Nanolithography, Science, pp. 661-663, vol. 283, 1999.

Polymer Source, Inc., Information Sheet—Custom Synthesis, comb polymer (poly(acrylic acid) backbone and poly(ethylene oxide) teeth), 2 p., Nov. 13, 2002.

Reed, James S., "Principles of Ceramic Processing", $2^{nd}$ Ed., John Wiley & Sons, Inc., pp. 525-541, 1995.

Sakai, E., et al., "Dispersion Mechanisms of Comb-Type Superplasticizers Containing Grafted Poly(ethylene oxide) Chains", Macromol. Symp. 175, pp. 367-376, 2001.

Schwartz, Steven A., "Gypsum Dispersing Agents", Global Gypsum Conference, pp. 1-10, 2002.

Seidel et al., "Artificial Spinning of Spider Silk," Macromolecules, pp. 6733-6736, vol. 31, 1998.

Silkroad C&T:Admixtures for Concrete, PEMA-200N, Product Information Sheet, 2 p., 2002.

Smay et al., "Colloidal Inks for Directed Assembly of 3-D Periodic Structures," Langmuir, pp. 5429-5437, vol. 18, 2002.

Smay et al., "Directed Colloidal Assembly of 3D Periodic Structures," Adv. Mater., pp. 1279-1283, vol. 14, 2002.

Stenius, P. et al., "Aggregation in concentrated kaolin suspensions stabilized by polyacrylate", Colloids and Surfaces, vol. 51, pp. 219-238, 1990.

Sukhishvili et al., "Layered, Erasable, Ultrathin Polymer Films," J. Am. Chem. Soc., pp. 9550-9551, vol. 122, 2000.

Takemoto Oil & Fat Co. Ltd. Product Information Sheet, 2 p., Nov. 13, 2002.

Tobori, N. et al., "Rheological behavior of highly concentrated aqueous calcium carbonate suspensions in the presence of polyelectrolytes", Colloids and Surfaces A: Physiochem. Eng. Aspects 00, pp. 1-9, 2002; (2 pages)—vol. 215, pp. 163-171, 2003.

Uhrig, D., et al., "Synthesis of Combs, Centipedes, and Barbwires: Poly(isoprene-graft-styrene) Regular Multigraft Copolymers with Trifunctional, Tetrafunctional, and Hexafunctional Branch Points", Macromolecules vol. 35, pp. 7182-7190, 2002.

Vermohlen, K., et al., "Adsorption of polyelectrolytes onto oxides—the influence of ionic strength, molar mass, and Ca2+ ions", Colloids and Surfaces A: Physicochem. Eng. Aspects 163, pp. 45-53, 2000.

Vlasov et al., "On-Chip Natural Assembly of Silicon Photonic Bandgap Crystals," Nature, pp. 289-293, vol. 414, 2001.

Vollrath et al., "Liquid Crystalline Spinning of Spider Silk," Nature, pp. 541-548, vol. 410, 2001.

Wu et al., "Fabrication of Complex Three-Dimensional Microchannel Systems in PDMS," J. Am. Chem. Soc., pp. 554-559, vol. 125, 2003.

Xia et al., "Soft Lithography," Angew. Chem Int. Ed., pp. 550-575, vol. 37, 1998.

Zezin et al., "A New Class of Complex Water-Soluble Polyelectrolytes," Russ. Chem. Rev., pp. 833-855, vol. 51, 1982.

Allahyarov, E. et al., "Attraction between Like-Charged Macroions by Coulomb Depletion", Physical Review Letters, vol. 81, No. 6, pp. 1334-1337, 1998.

Allahyarov, E. et al., "Effective forces between macroions: The cases of asymmetric macroions and added salt", Physical Review E, vol. 57, No. 5, pp. 5818-5824, 1998.

BIC, "Zeta Potential Applications", article from the Internet, http://www.bic.comfZetaPotentialApplications.htm>, 4 pages, printed Sep. 14, 2001.

Braun, Paul V. et al., "Electrochemical Fabrication of 3D Microperiodic Porous Materials", Advanced Materials, vol. 13, No. 7, pp. 482-485, 2001.

Braun, Paul V. et al., "Electrochemically grown photonic crystals", Nature, vol. 402, pp. 603-604, 1999.

Braun, Paul V. et al., "Optical spectroscopy of high dielectric contrast 3D photonic crystals", Europhys. Lett., vol. 56, pp. 207-213, 2001.

CAMP Annual Report 2000, "Colloidal Dispersions and Processing", Center for Advanced Materials Processing, 2000, article from the Internet, http://www.clarkson.edu/camp/annual_report/page6.htm>, 2 pages, printed Sep. 14, 2001.

Ferreira, Paula G. et al., "Mixtures of charged colloids and nonadsorbing flexible polyelectrolytes: An integral equation study", J. Chem. Phys., vol. 113, No. 21, pp. 9849-9862, 2000.

Garibay-Alonso, R. et al., "Phase separation of binary liquid mixtures of hard spheres and Yukawa particles", Physica A, vol. 235, pp. 159-169, 1997.

Malvern, "The use of the Malvern Zetasizer for the measurement of Zeta Potential", article from the Internet, http://www.malvern.co.alLaboratory/zetaintm.htm>, 10 pages, printed on Feb. 12, 2002.

Malvern, "Zeta Potential Theory, Dispersion stability", article from the Internet, http://www.malvern.co.uk/Laboratory/zettheo.htm>, 3 pages, printed on Feb. 12, 2002.

Mendez-Alcaraz, J.M. et al., "Depletion forces in colloidal mixtures", Physical Review E, vol. 61, No. 4, pp. 4095-4099, 2000.

Mendez-Alcaraz, J.M. et al., "Structural properties of colloidal suspensions", Physica A, vol, 220, pp. 173-191, 1995.

Mendez-Alcaraz, J.M. et al., "Structure of Binary Colloidal Mixtures of Charged and Uncharged Spherical Particles", Langmuir, vol. 8, pp. 2913-2920, 1992.

Ramakrishnan, S. et al., "Characterizing nanoparticle interactions: Linking models to experiments", J. Chem. Phys., vol. 113, No. 3, pp. 1237-1248, 2000.

Rouzina, Ioulia et al., "Macroion Attraction Due to Electrostatic Correlation between Screening Counterions. 1. Mobile Surface-Adsorbed Ions and Diffuse Ion Cloud", J. Chem. Phys., vol. 100, No. 23, pp. 9977-9989, 1996.

The Sol-Gel Gateway, "Suppliers-Colloidal solutions and nanoparticles", article from the Internet, http://www.solgel.com/precursors/sols.htm>, 3 pages, printed on Sep. 14, 2001.

Tohver, Valeria, "Nanoparticle Engineering of Complex Fluid Behavior", Langmuir, vol. 17, No. 26, pp. 8414-8421, 2001.

Tohver, Valeria, "Nanoparticle halos: A new colloid stabilization mechanism", PNAS, vol. 98, No. 16, pp. 8950-8954, 2001.

Verhaegh, Nynke et al., "Transient gelation by spinodal decomposition in colloid-polymer mixtures", Physica A, vol. 242, pp. 104-118, 1997.

Verhaegh, Nynke et al., "Transient gels in colloid-polymer mixtures studied with fluorescence confocal scanning laser microscopy", Physica A, vol. 264, pp. 64-74, 1999.

Weeks, James R., "Formation and collapse of gels of sterically stabilized colloidal particles", J Phys. Condens. Matter, vol. 12, pp. 9599-9606, 2000.

Wessling, Dr. Berhard, "Conductive Polymer / Solvent Systems: Solutions or Dispersions?", Zipperling Kessler/ Ormecon Chemie, dated 1996, article from the Internet, http://www.zipperling.de/Research/soludisp/kap13.html>, printed Sep. 14) 2 pages, printed Sep. 14, 2001.

Vincent, B. et al., "Adsorption of Small, Positive Particles onto Large, Negative Particles in the Presence of Polymer", J.C.S. Faraday I, V. 76, Iss. 3, pp. 665-673, 1980.

Luckham, P.F., et al., "The Controlled Flocculation of Particulate Dispersions Using Small Particles of Opposite Charge. III. Investigation of Floc Structure Using Rheological Techniques", Colloids and Surfaces, vol. 6, pp. 101-118, 1983.

Hawley's Condensed Chemical Dictionary, Eleventh Edition, edited by Sax and Lewis, Sr. (Van Nostrand Reinhold Company, New York, NY, copyright 1987),p. 25, (Oct. 1989).

Michna, S. et al., "Concentrated hydroxyapatite inks for direct-write assembly of 3-D periodic scaffolds", Biomaterials, vol. 26, pp. 5632-5639, (2005).

Deubel, M. et al., "Direct laser writing of three-dimensional photonic-crystal templates for telecommunications", Nature Materials, vol. 3, pp. 444-447, (2004).

Kim, I. et al., "Ultrasensitive chemiresistors based on electrospun TiO2 nanofibers", NanoLetters, vol. 6, No. 9, pp. 2009-2013, (2006).

Ding, X-Z. et al., "Effect of tin dioxide doping on rutile phase formation in sol-gel-derived nanocrystalline titania powders", NanoStructured Materials, vol. 4, No. 6, pp. 663-668, (1994).

Chutinan, A. et al., "Highly confined waveguides and waveguide bends in three-dimensional photonic crystal", Applied Physics Letters, vol. 75, No. 24, pp. 3739-3741, (1999).

Cotton, F.A. et al., Advanced Inorganic Chemistry, Fifth Edition, ed. John Wiley & sons, pp. 215-217, pp. 781-782, 7 pages total, (1988).

Seet, K.K. et al., "Three-dimensional spiral-architecture photonic crystals obtained by direct laser writing", Advanced Materials, vol. 17, No. 5, pp. 541-545, (2005).

Morissette, S.L. et al., "Solid freeform fabrication of aqueous alumina-poly(vinyl alcohol) gelcasting suspensions", Journal of the American Ceramic Society, vol. 83, No. 10, pp. 2409-2416, (2000).

Morrissette, S.L. et al., "Chemorheology of aqueous-based alumina-poly(vinyl alcohol) gelcasting suspensions", Journal of the American Ceramic Society, vol. 82, No. 3, pp. 521-528, (1999).

Kozuka H. et al., "Crack-free thick ceramic coating films via non-repetitive dip-coating using polyvinylpyrrolidone as stress-relaxing agent", Journal of Sol-Gel Science and Technology, vol. 19, pp. 205-209, (2000).

DuPont Tyzor Organic Titanates General Brochure found at http://www.dupont.com/tyzor, 12 pages, (2001).

V. Gopalakrishnan and C.F. Zukoski—"*Yielding Behavior of Thermo-Reversible Colloidal Gels*"—Langmuir, 23, 15 (2007) 8187-93—Abstract only—(1 pg).

Anderson, J.R., et al., "Fabrication of Topologically Complex Three-Dimensional Microfluidic Systems in PDMS by Rapid Prototyping", Anal. Chem. 72, pp. 3158-3164, 2000.

Aref, H., "The Development of Chaotic Advection", Phys. Fluids 14, pp. 1315-1325, 2002.

Axim Italcementi Group, Catexol™ m Superflux 2000 PC, with Material Safety Data Sheet (MSDS), 7 p., Nov. 13, 2002.

Bautista, F. et al., "Understanding Thixotropic and Antithixotropic Behavior of Viscoelastic Micellar Solutions and Liquid Crystalline Dispersions. I. The Model." Journal of Non-Newtonian Fluid Mechanics, vol. 80, pp. 93-113, 1999.

Burns, M.A., et al., "An Integrated Nanoliter DNA Analysis Device" Science 282, pp. 484-487, 1998.

Chabinyc, M.L., et al., "An Integrated Fluorescence Detection System in Poly(dimethylsiloxane) for Microfluidic Applications" Anal. Chem. 73, pp. 4491-4498, 2001.

Choi, J.W., et al., "An Active Microfluidic Mixer for Mixing of Microparticles and Liquids"; SPIE Proceedings 4177, The International Society for Optical Engineering, pp. 154-161, 2000.

Chou, H.P., et al., "A Microfabricated Device for Sizing and Sorting DNA Molecules", Proc. Natl. Acad. Sci. 96, pp. 11-13, 1999.

Jeon, N.L., et al., "Generation of Solution and Surface Gradients Using Microfluidic Systems", Langmuir 16, pp. 8311-8316, 2000.

Jones, S.W., "Interaction of Chaotic Advection and Diffusion", Chaos Applied to Fluid Mixing, Aref, H. and El Naschie, M.S., eds., pp. 185-196, 1995.

Loctite Corporation Prussian Blue, Material Safety Data Sheet dated Jan. 6, 2002, 5 pages; http://www.loctite.com/datasheets/msds/30520.html, Jan. 14, 2002.

LOCTITE® Product Description Sheet Prussian Blue, Maintenance, Repair & Operations, 1p, Jan. 1999.

Losey, M.W., et al., "Microfabricated Multiphase Packed-Bed Reactors: Characterization of Mass Transfer and Reactions", Ind. Eng. Chem. Res. 40, pp. 2555-2562, 2001.

Mas, R., et al., "Rheology of Colloidal Suspensions: Case of Lubricating Greases," Journal of Rheology, vol. 38, No. 4, pp. 889-908, 1994.

Moore, S.K., "Microfluidics For Complex Computation", IEEE Spectrum 38, pp. 28-29, 2001.

Smay, James E., et al., "Colloidal Inks for Directed Assembly of 3-D Periodic Structures", Langmuir, pp. 5429-5437, vol. 18, No. 14, 2002.

Stromberg, A., et al., "Microfluidic Device for Combinatorial Fusion of Liposomes and Cells", Anal. Chem. 73, pp. 126-130 2001.

White, S.R., et al., "Autonomic Healing of Polymer Composites", Nature 409, pp. 794-797, 2001.

Nguyen, T. T. et al., "Macroions in Salty Water with Multivalent Ions: Giant Inversion of Charge", *Physical Review Letters*, vol. 85, No. 7, pp. 1568-1571, 2000.

D.H. Napper, "Polymeric Stabilization of Colloidal Dispersions", Academic Press, pp. 28-30, (1983).

\* cited by examiner

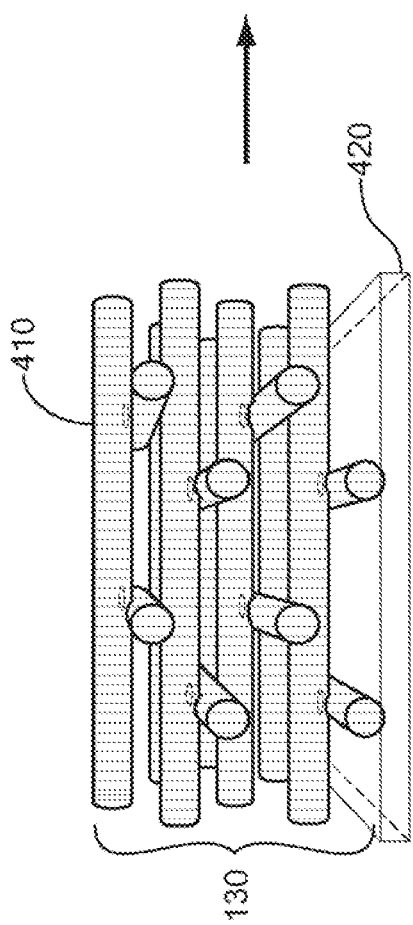
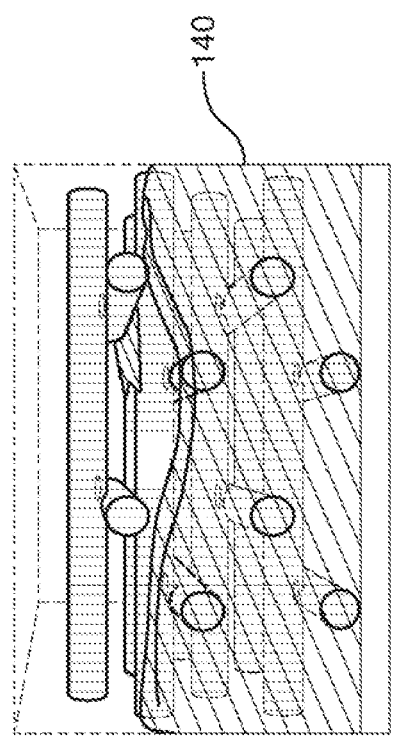
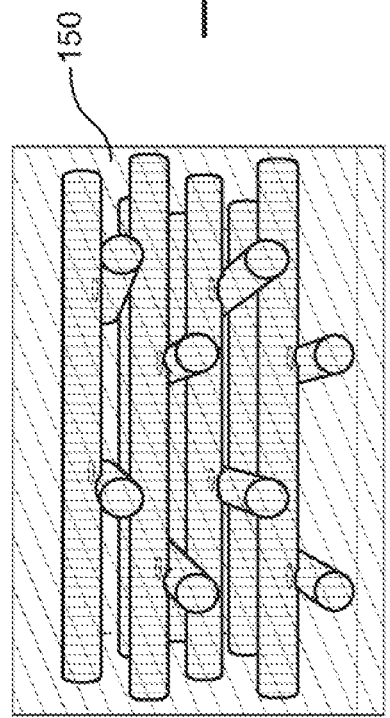
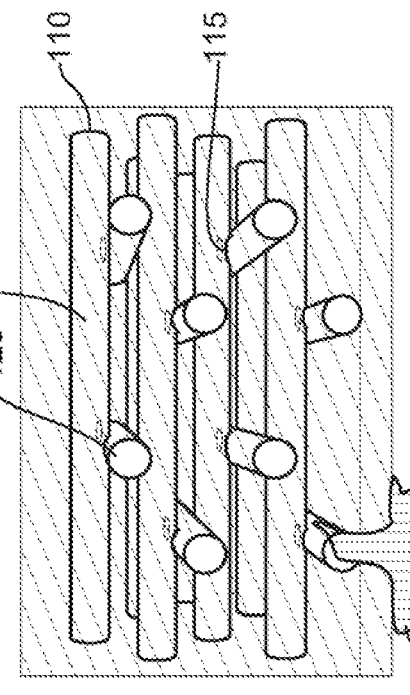

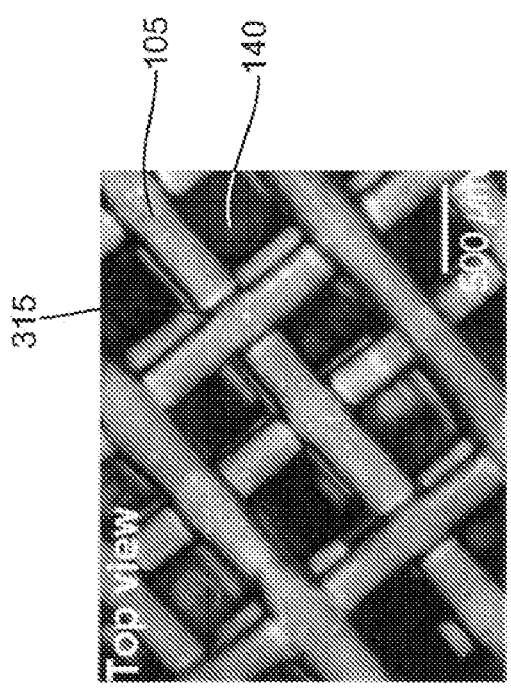
FIG. 3A-1
FIG. 3A-2
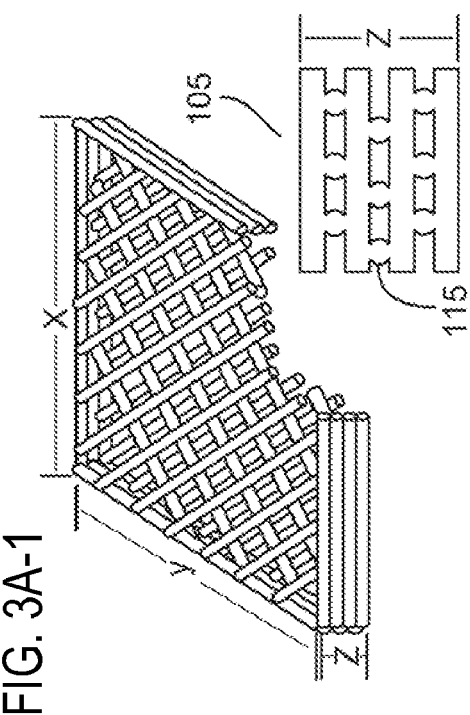
FIG. 3B
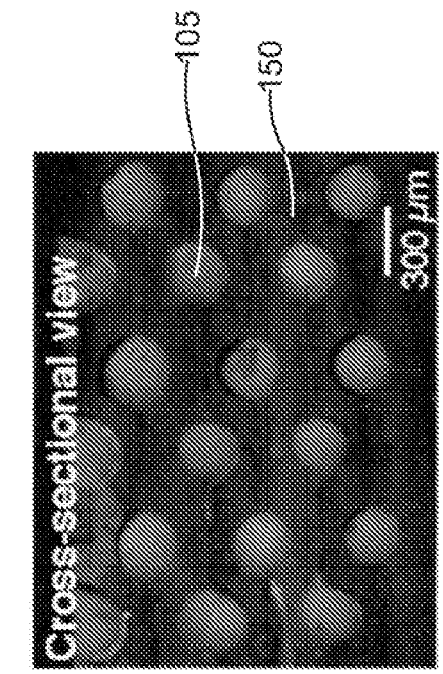
FIG. 3C
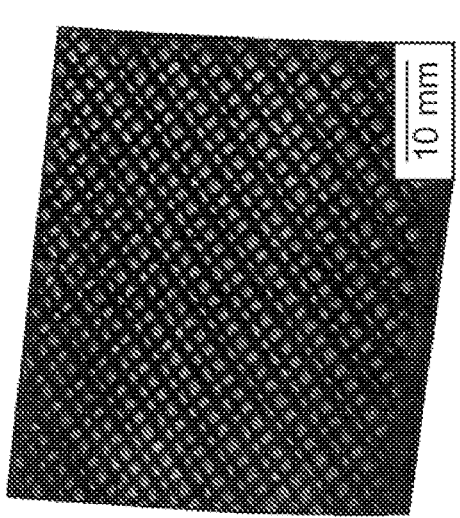
FIG. 3D

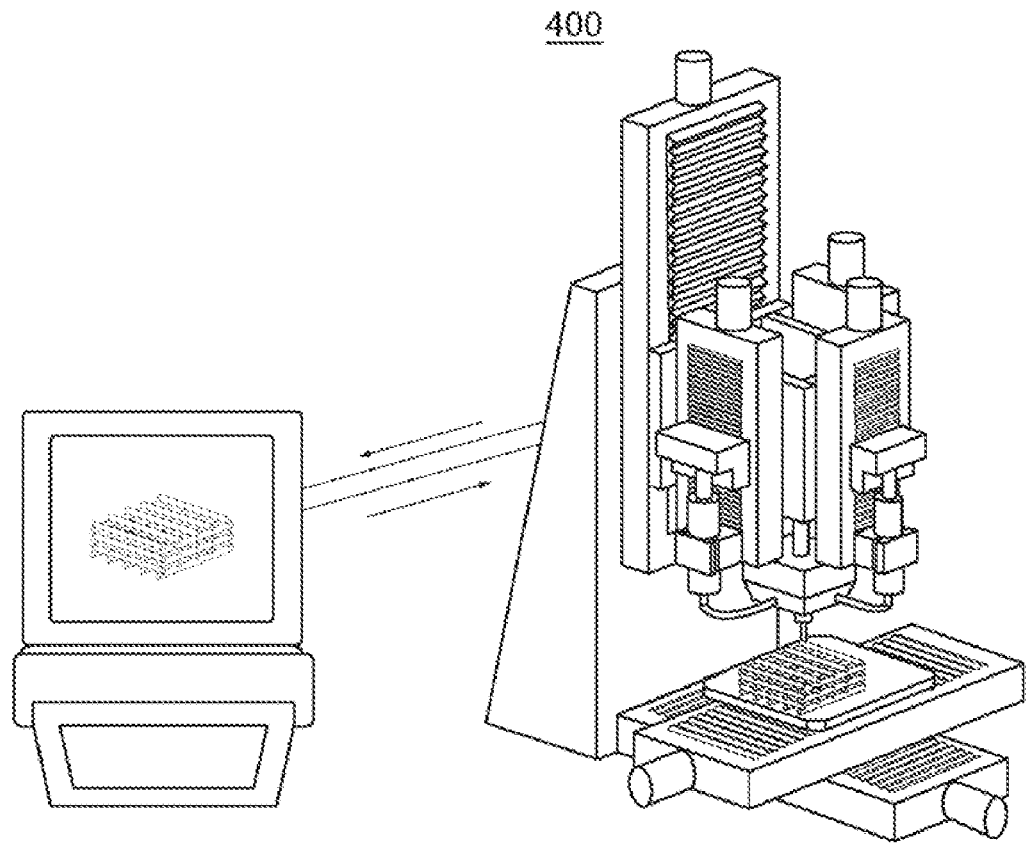
FIG. 4A-1                        FIG. 4A-2
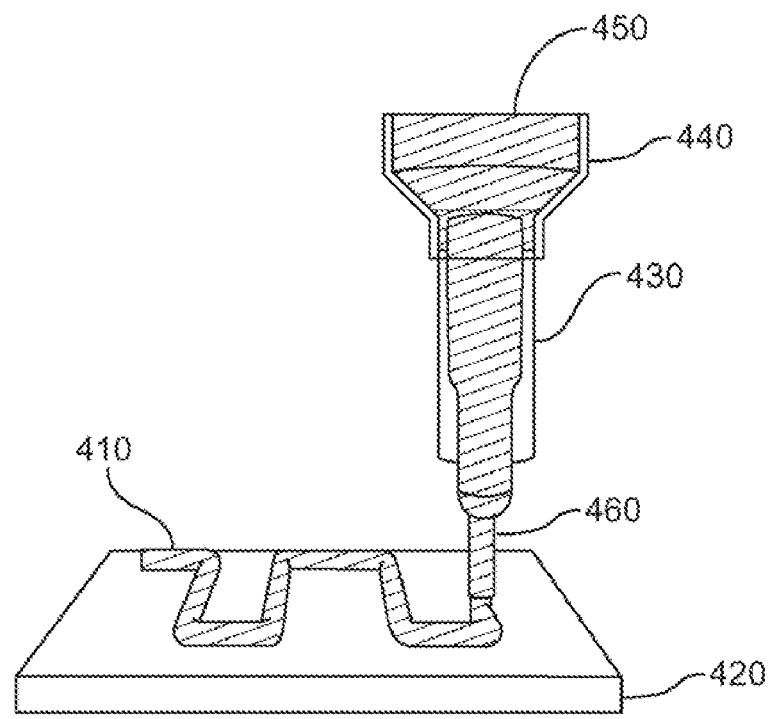
FIG. 4B

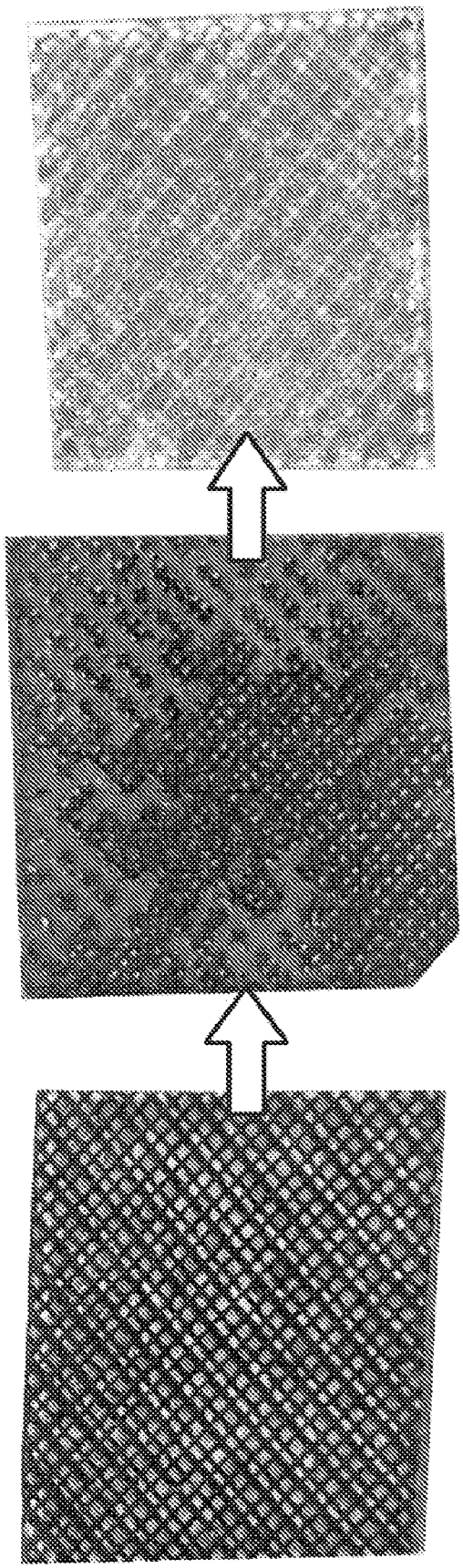
FIG. 6A Full Passageways
FIG. 6B Partially Empty Passageways
FIG. 6C Empty Passageways

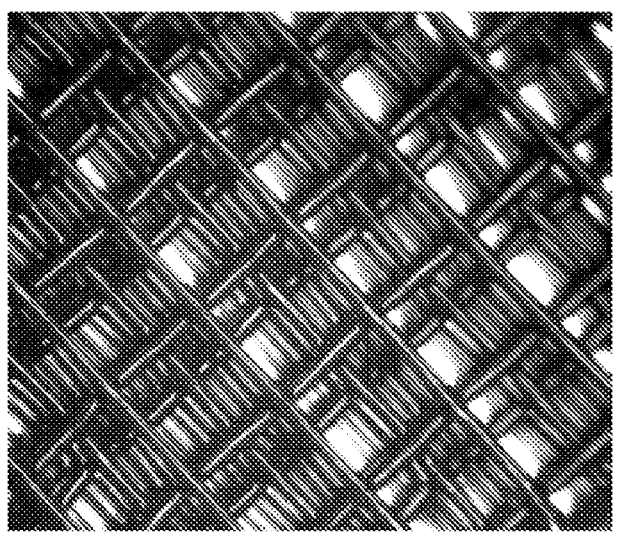
FIG. 9A
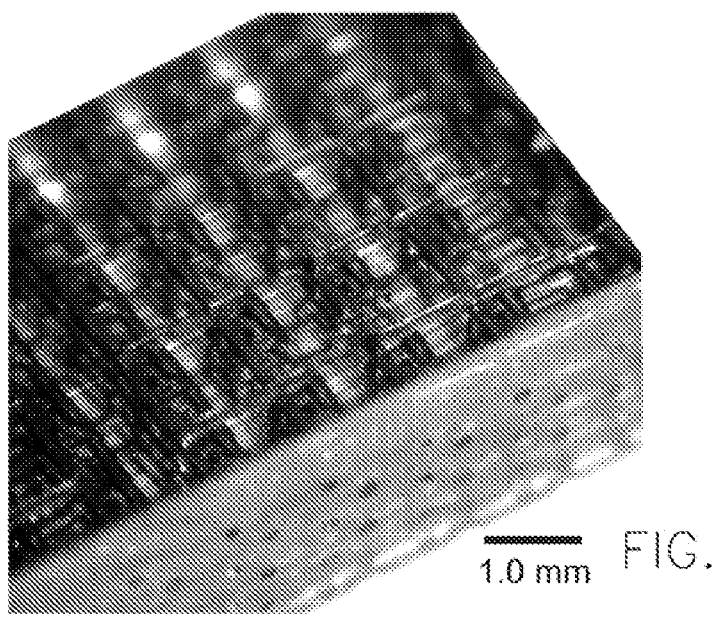
FIG. 9B
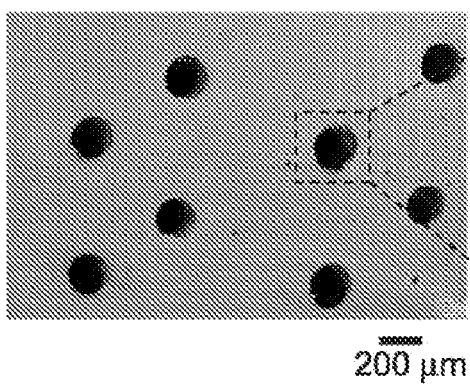 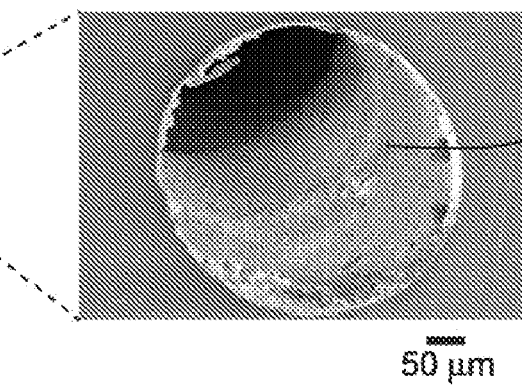
FIG. 9C-1  FIG. 9C-2

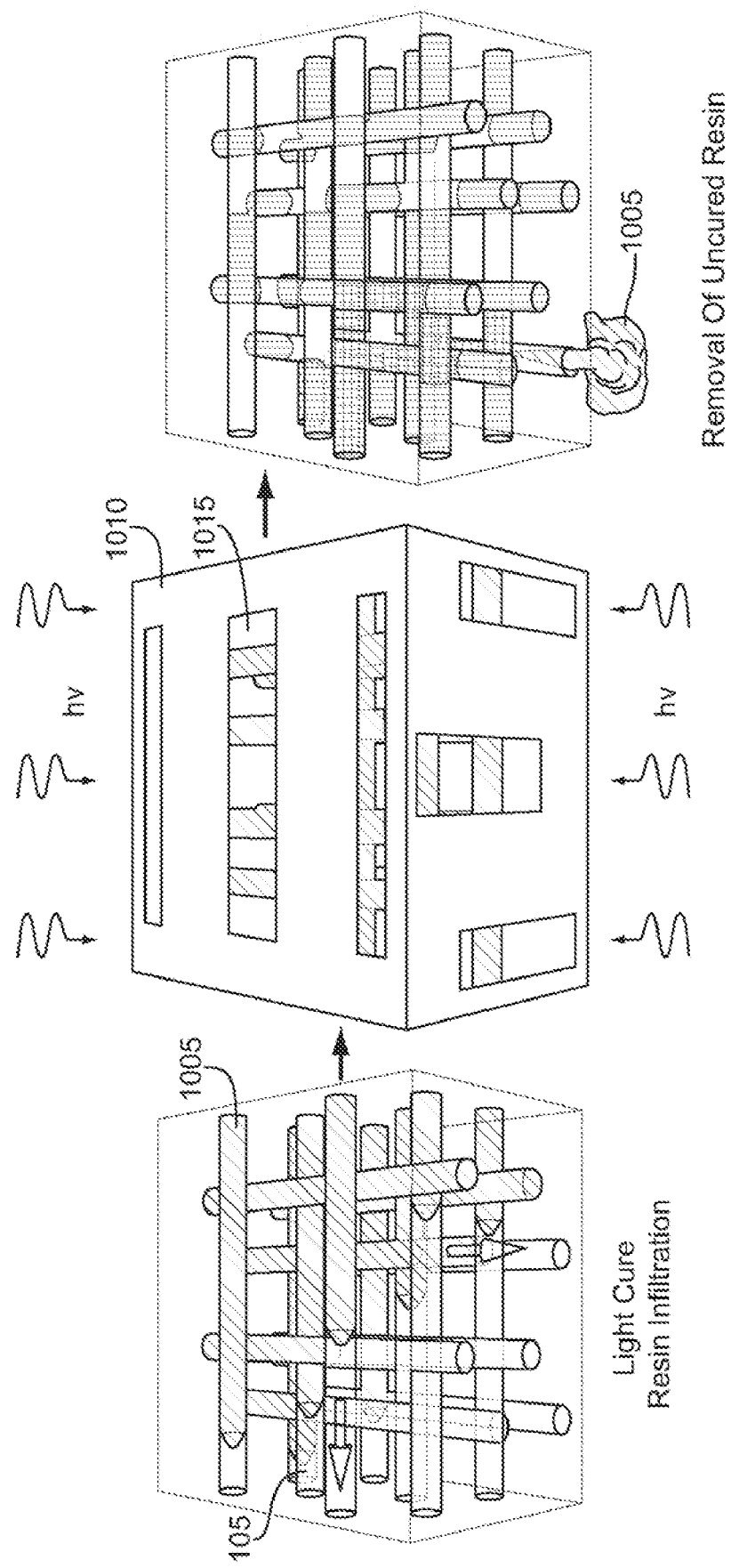

Top View

Side View

Top View

Side View

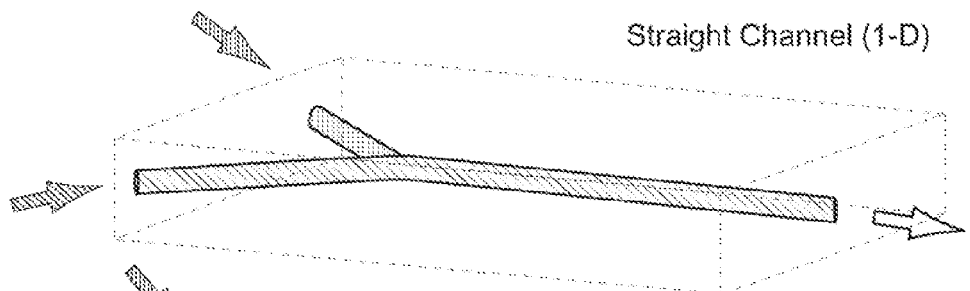
FIG. 14A-1
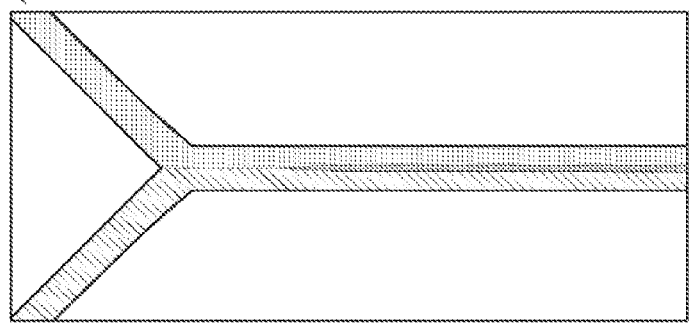
FIG. 14A-2
Red
Yellow
Green
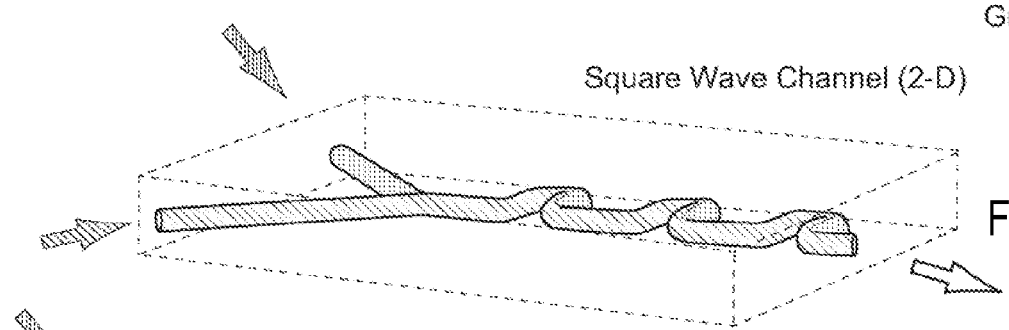
FIG. 14B-1
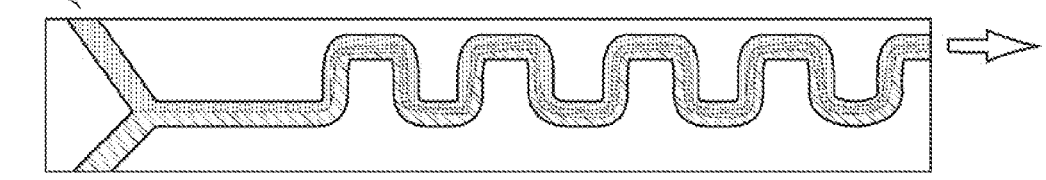
FIG. 14B-2

Series Of Mixing Towers (3-D)

Red
Yellow
Green

MICROCAPILLARY NETWORKS

REFERENCE TO PRIOR APPLICATION

This application is a divisional of Ser. No. 11/558,084, filed Nov. 9, 2006, now U.S. Pat. No. 7,799,251, which is a divisional of Ser. No. 10/673,083, filed Sep. 26, 2003 now abandoned which claims the benefit of U.S. Provisional Application No. 60/413,985, entitled "Microcapillary Networks," filed on Sep. 26, 2002, which is hereby incorporated by reference herein in its entirety.

FEDERALLY SPONSORED RESEARCH OR DEVELOPMENT

This application was funded in part under the following research grants and contracts: AFOSR Aerospace and Materials Science Directorate Grant No. F49620-00-1-0094 and NSF DMI Grant No. 00-99360. The U.S. Government may have rights in this invention.

BACKGROUND

Microchannel networks can include a multitude of interconnected passageways. These microchannel networks are often used in microfluidic systems. A more complete description of microchannel networks and their application in microfluidic devices may be found in Anderson, J. A., et al., Fabrication of topologically complex three-dimensional microfluidic systems in PDMS by rapid prototyping. *Anal. Chem.* 74, 3158-64 (2000).

Conventional microchannel devices are constructed by multiple methods, including laser machining, laser chemical processing, sacrificial wax, soft lithography, photopatterning, fused deposition, and two-photon polymerization. Two-dimensional microchannel devices are generally made by photolithographic or soft lithographic techniques and are limited to patterns on a flat surface, or at most a few stacked layers. Forming these devices requires repetitive lithographic processing, in which each layer requires a separate mask or stamp. Multiple series of plates may be joined to form structures having a few vertical layers.

These devices are made by etching open troughs into separate plates. Due to the limitations of lithography, the sidewalls of the etched troughs are straight. These plates are then joined, such as with an adhesive, so the open troughs align to form closed microchannels having square or rectangular internal shapes.

The approximately 90° corners of the square or rectangular microchannels provide many locations for stress cracks to form due to stress concentration at the corners. Since structures incorporating lithographically formed microchannels have a tendency to crack, square or rectangular microchannels are unsuitable for use in structural composite materials. Furthermore, structural materials, such as epoxy based materials, cannot generally be etched using lithographic methods.

In addition to these square or rectangular microchannels weakening materials in which they are incorporated, the corners provide areas for solids to collect. In this fashion, when colloids or other solid containing fluids are passed through the device, some of the solids collect in the corners. This build up of solids can result in decreased fluid movement through the device, in addition to plugging.

There is a need for self-healing structural materials. Structural thermosetting polymers and fiber reinforced polymer composites, which are used in a wide variety of applications ranging from microelectronics to composite aircraft structures, such as fuselages, wings, and rotors, are susceptible to damage in the form of cracking. These cracks can form deep within the structure where detection is difficult and repair is virtually impossible.

Conventional self-healing or self-sealing materials use a microencapsulated healing agent and a dispersed catalyst inside a polymer matrix to repair themselves. These self-healing materials are able to recover approximately 75% of the toughness of the original material prior to cracking. However, the use of these materials is limited because they can deliver the healing agent into the crack plane only once.

In addition to improved self-healing materials, there is a need to exert greater control over fluid flow and mixing in microchannel devices. Control over fluid flow and mixing is difficult in microfluidic devices because laminar flow and diffusive mixing are the dominant mixing modes. These problems are of particular concern for mixing fluids that contain biological or other large molecules, such as DNA or proteins, because such species diffuse slowly. In these devices, prohibitively long path lengths are often required to ensure complete mixing of the fluid constituents.

To reduce the planar footprint of such devices, recent efforts have focused on various design strategies for fluid mixing based on chaotic advection. Chaotic advection is believed to promote rapid stretching and folding of the fluid interfaces that are believed to exist within complex fluid flow patterns. A more detailed description of chaotic advection can be found in Aref, H., "The development of chaotic advection." *Phys. Fluids* 14, 1315-25 (2002).

It is believed that chaotic advection is created in a fluid flow by either causing unsteadiness in the rate of fluid flow, or by providing geometrically complex channels to direct the fluid. By exploiting this phenomenon on the micro-scale, the interfacial surface area across which diffusion occurs is thought to greatly increase. Prior strategies of fabricating microfluidic devices believed capable of chaotic advection include fluid direction channels having "twisted pipe architectures" and devices having bas-relief structures imprinted along the floor of the fluid direction channels. While these methods may result in enhanced mixing, the complexity of the devices is limited due to the planar nature of the devices and the rectangular features obtained.

As can be seen from the above description, there is an ongoing need for simple and efficient materials and methods for forming microchannel-type devices, including microfluidic devices used for mixing and materials with the ability to self-heal. The microcapillary devices, fabrication methods, and materials of the present invention overcome one or more of the disadvantages associated with conventional devices.

SUMMARY

In one aspect, a device including a host having at least one, hollow, interconnected passageway is disclosed. The passageway has an average diameter from 0.1 micron to 1000 microns and is substantially tubular in shape. Methods of forming this host by removing a fugitive material from a cured host material are also disclosed.

In another aspect, a host having internal, vertically-oriented, square-spiral mixing towers is disclosed.

In another aspect, a method of closing an opening in an article is disclosed.

In another aspect, a method of mixing a fluid is disclosed.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like references numerals designate corresponding parts throughout the different views.

FIGS. 2A-2D is a schematic representation of the fabrication of a microcapillary network incorporating aspects of the present invention.

FIGS. 3A-1, 3A-2, 3B, 3C and 3D show a host having a three-dimensional microcapillary network residing within the host, which incorporates aspects of the present invention.

FIGS. 4A-1, 4A-2, and 4B depict a robotically controlled deposition machine and the deposition of a fugitive material filament on a substrate.

FIGS. 6A-6C depict the removal of a fugitive material from a host incorporating aspects of the present invention.

FIGS. 9A, 9B, 9C-1 and 9C-2 show a host having a three-dimensional microcapillary network of orthogonal passageways, which incorporates aspects of the present invention.

FIG. 10A, 10B and 10C depicts the formation of a flow altered host using a light curable resin and a photomask.

FIGS. 14A-1, 14A-2, 14B-1, 14B-2, 14C-1 and 14C-2 depict devices including hosts having one-, two-, and three-dimensional passageways, which incorporate aspects of the present invention.

DETAILED DESCRIPTION

Microcapillary devices that include hosts having interconnected, substantially tubular passageways with average diameters from 0.1 to 1000 microns are disclosed. Methods of making these hosts, along with preferable fugitive materials used in the construction of the hosts are also disclosed. The resultant microfluidic hosts may be used in a vast array of applications, including biotechnology, self-healing materials, sensors, chemical reactors, and fluidic-based computers.

Microcapillary Networks

Figures 1, 14C:
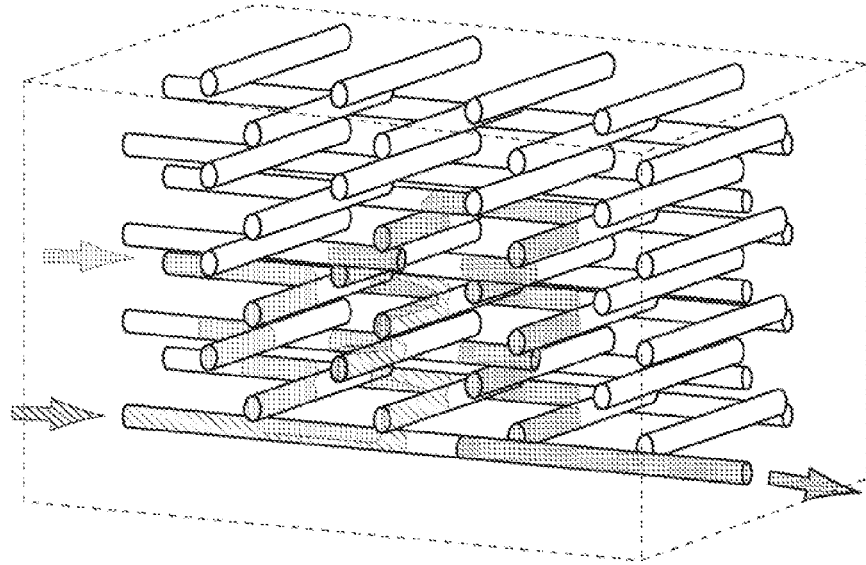
Figures 2, 14C:
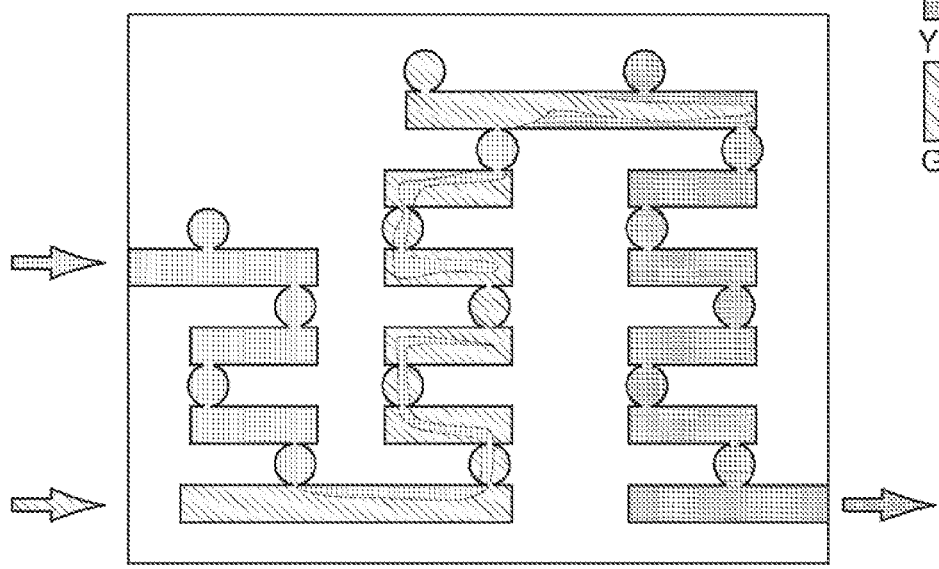

Microcapillary networks in accord with the present invention include one or more substantially tubular, hollow passageways having a plurality of hollow interconnects. FIGS. 1 and 2A-2D are representations depicting the formation of a host 150 having substantially tubular passageways 105, which may be parallel 110 and perpendicular 120 to the plane of the page, and multiple interconnects 115 between the parallel and perpendicular passageways. The host can be any structure that contains the one or more passageways and interconnects. FIG. 2A depicts the deposition of a fugitive material filament 410, the infiltration of a host material 140 (FIG. 2B), the solidification of the host material to form the host 150 (FIG. 2C), and the removal of the fugitive material 450 from the host 150.

As used in the following specification and appended claims, "substantially tubular" means that the majority of the cross-sectional periphery of the passageway through the host 150 is curved in shape. Curved can include circular, elliptic, rounded, arched, parabolic and other curved shapes. Examples of substantially tubular passageways are shown, for example, as 105 in FIGS. 3D, 7B, and 9C.

Unlike in conventional microchannel devices that have square or rectangular microchannel passageways, the passageways in the claimed invention are not formed by aligning open troughs carved in two substrates and then bonding the substrates with the troughs aligned, thus forming a square or rectangular channel. Instead, microcapillary passageways in accord with the present invention are substantially tubular in shape.

The average diameter of the at least one substantially tubular passageway is preferably from 0.1 micron to 1000 microns and more preferably from 10 microns to 500 microns. An especially preferred average diameter for the passageway is from 50 microns to 250 microns. Hollow interconnects 115 are present in the passageway wherever a first portion of the passageway contacts a second portion of the passageway, or wherever a first passageway contacts a second passageway. In this manner, interconnects connect the passageway at a plurality of locations, thus establishing fluid communication between the passageways.

Because the hollow interconnects 115 are formed by contact of one or more fugitive material filaments having a diameter nearly identical to that of the passageway, the longest cross-sectional dimension of a hollow interconnect is preferably less than 2.5 times the average diameter of the one or more passageway that contacts to form the interconnect. More preferably, the longest cross-sectional dimension of the interconnect is less than 2.2 times the average diameter of the one or more passageway that contacts to form the interconnect. In an especially preferred embodiment, the longest cross-sectional dimension of the interconnect is less than twice the average diameter of the one or more passageway that contacts to form the interconnect. It is understood that if an interconnect if formed by more than one contact, such as when three filaments overlap in the z dimension to form two contacts, the longest cross-sectional dimension of the resultant multi-contact interconnect (which is actually formed from three filaments contacting to form two interconnects separated by a passageway) is preferably less than 3.75 times the average diameter of the individual filaments.

Fluids introduced into the microcapillary network through the at least one passageway in the host can flow through the passageway and through the interconnects. Thus, if a host is provided with an inlet port and an outlet port, a fluid pumped into the inlet port can flow through the one or more passageway and interconnects within the host and out through the outlet port. As used in the specification and appended claims, a "fluid" is defined as a substance in the liquid or gaseous state.

Preferable microcapillary three-dimensional hosts have at least one passageway aligned along a first plane in the x and y dimensions that extends perpendicular to the first plane in a z dimension and continues in a substantially planar fashion in a second x and y dimension plane. In this aspect, the second plane is substantially parallel to the first plane. For example, the illustrative host shown in FIG. 3A has a longer x and y than z dimension passageway. Thus, the passageway 105 in the host is longer in the x and y dimensions than in the z dimension. In this device, the interconnects 115 are formed in the z dimension when one or more x-y dimension passageway contacts in the z dimension.

Fabrication

Microcapillary devices are preferably fabricated with a robotically controlled deposition machine (RCD). An illustration of a RCD 400 is shown in FIG. 4A. FIG. 4B depicts the deposition of a fugitive material filament 410 on a substrate 420 by the RCD machine 400. Through the computer-controlled, layer-by-layer deposition of the fugitive material filament 410 on a substrate, one-dimensional, two-dimensional, and three-dimensional fugitive material scaffolds 130 are formed. Microcapillary devices may then be fabricated when these scaffolds are removed from the host. As used in the specification and appended claims, "scaffold" is used to describe a two- or three-dimensional structure made from one or more fugitive material filaments. As used in the specification and appended claims, "on" the substrate includes when a filament is adjacent to the substrate and when filaments are separated by one or more intervening filaments.

Any substrate 420 may be used that is capable of supporting the deposited fugitive material scaffold 130. For example, preferable substrates may be planar or curved in shape. Preferable substrates include those made from glass, plastic, metal, or a combination thereof.

Figure 1:
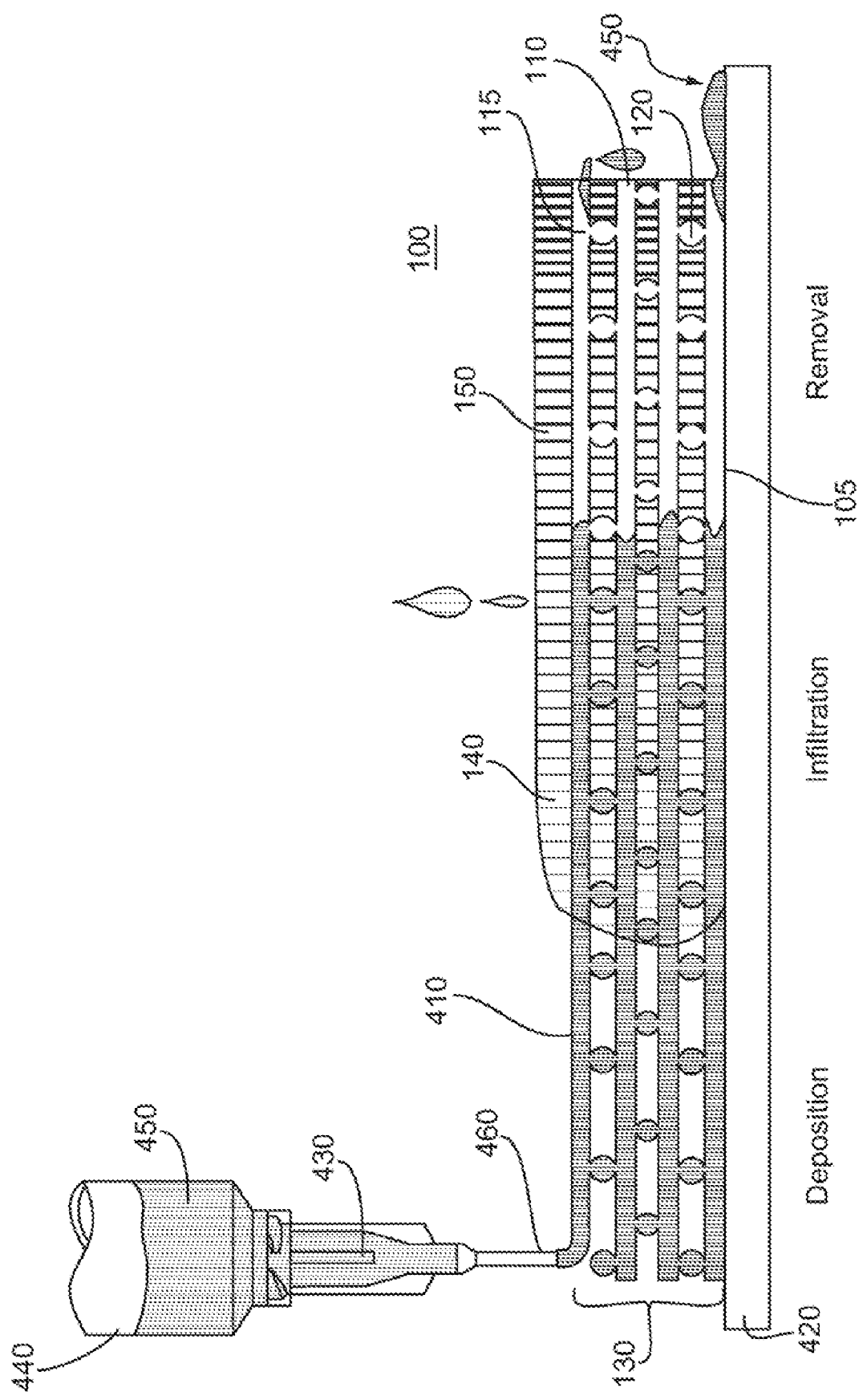
FIG. 1 depicts the fabrication of a microcapillary network incorporating aspects of the present invention.

A deposition head 430 of the RCD machine 400, as depicted in FIGS. 1 and 4B, preferably holds a syringe 440 filled with a fugitive material 450. Air pressure may then be used to force the fugitive material 450 through the tip of the syringe 440 and out an orifice 460, such as a needle. The fugitive material 450 emerges from the orifice 460 as the filament 410 and is deposited by gravity on the substrate 420.

The average diameter of the filament 410 deposited on the substrate 420 may be controlled by the inner diameter of the orifice 460 and the pressure applied to the syringe 440. In one preferred aspect, the average diameter of the filament is ±20% that of the orifice, more preferably ±10%. In an especially preferred aspect, the average diameter of the filament is ±5% that of the extrusion orifice 460.

In another aspect, the average diameter of the filament 410 is less than that of the orifice 460. A smaller average diameter filament may be accomplished by using a fugitive material 450 capable of self-assembly after extrusion. A more detailed description of self-assembly may be found in H. Fan, et al., "Rapid Prototyping of Patterned Functional Nanostructures," Nature, Vol. 405, pp. 56-60 (2000), incorporated by reference in its entirety, except that in the event of any inconsistent disclosure or definition from the present application, the disclosure or definition herein shall be deemed to prevail.

Preferably, the average diameter of the extruded filament 410 is from 0.1 micron to 1000 microns and more preferably from 10 microns to 500 microns. An especially preferred average filament diameter is from 50 microns to 250 microns. In a preferred aspect, high precision electrical engines move the substrate and/or the filament deposition head 430 at the desired speed and direction to form the fugitive material scaffold. With the planar motion of the substrate (in the x and y directions), the motion of the RCD deposition head (in the z direction), and the fugitive material flowing from the orifice, it is possible to build scalable, one-, two-, and three-dimensional scaffolds 130 using a layer-by-layer building sequence, for example. In one preferred aspect, the RCD first deposits the filament onto a moving x-y platform to yield a two-dimensional scaffold layer. Then, the platform or the RCD head is moved in the z-direction to deposit another x-y scaffold layer. In this manner, scaffolds having 100's of layers in the z dimension may be formed.

Preferably, the formation of a microcapillary device incorporating aspects of the present invention is a three-step process as represented in FIGS. 1 and 2A-2D. A fugitive material 450 may be deposited from the orifice 460 of the deposition head 430 onto a substrate 420 to form a scaffold 130 that includes one or more fugitive material filaments 410. Representative scaffolds are shown in FIG. 1 and FIG. 2A.

A host material 140 that infiltrates the scaffold 130, but does not substantially infiltrate the filaments 410, may then be deposited on the scaffold. Substantial infiltration of the fugitive material filaments 410 occurs when greater than 20% of the average diameter of the filament is penetrated by the host material. Preferably, at least a portion of the scaffold 130 is encapsulated by the host material 140. In an especially preferred aspect, the entire scaffold is encapsulated by the host material. Infiltration of the scaffold by the host material is depicted in FIGS. 1 and 2B. To further stiffen the scaffold 130 and reduce host material infiltration into the filaments, the scaffold may be cooled prior to host material infiltration, such as to −70° C., to further increase the rigidity of the fugitive material.

The host material 140 may be any material or combination of materials that can fill the interstitial spaces exterior to the scaffold filaments 410. Preferred host materials may be deposited as liquids, slurries, or fine powders. More preferred host materials include, but are not limited to, plastics that may be applied in a viscous, liquid state and cured to form a solid or semi-solid host 150 of a cured host material.

Preferable host materials 140 that may be applied as powders or liquids include, but are not limited to, plastics, polyesters, polyamides, polyethers, epoxies, latexes, poly(dimethyl siloxane) (PDMS), their derivatives, and mixtures thereof. At present, an especially preferred host material that may be deposited as a viscous liquid is epoxy.

Preferable host materials that may be deposited as slurries or fine powders include ceramics and metals. Preferable ceramics that may be deposited as host materials include hydroxyapatite, titanium oxide, lead zirconate, titanate, alumina, silica, zirconia, silicon nitride, barium titanate, and silicon carbide, or mixtures thereof. Preferable metals that may be deposited as host materials include steels, molybdenum, nickel, gold, silver, platinum, titanium-aluminum-vanadium alloys, tungsten, and aluminum, or mixtures or alloys thereof.

Curing is the process by which a liquid, paste, powder, or other formable host material is converted to a solid or semi-solid less formable host. Examples of a host are depicted in FIG. 1 and FIG. 2C. In one aspect, curing occurs when monomers or low molecular weight polymers are polymerized to form polymers or higher molecular weight polymers, respectively. In another aspect, curing occurs when a polymer is crosslinked. In a further aspect, curing involves the conversion of fine or micro-fine flowable particles into a larger, non-flowable mass.

Curing may be performed by any method known to those of ordinary skill in the art, including, but not limited to, the addition of chemical curing agents, exposure to light or other forms of radiation, or heat. If a chemical curing agent is used, it may be added to the host material 140 before or after the host material is applied to the scaffold 130. At present, an especially preferred curing process relies on the chemical curing of epoxy host materials.

The host material 140 may be substantially homogeneous throughout, or optionally modified with particles to change the viscosity or the after curing structural performance of the host 150. However, the portion of the host material containing the fugitive scaffold 130 is not preferably built up by laminating two or more pre-cured layers. In an especially preferred embodiment, the portion of the host material 140 encompassing the fugitive material scaffold 130 is cured to form the host 150 in a single step.

Preferable particles useful for modifying the host material 130 include, but are not limited to, plastic and non-plastic particles, such as ceramics, glasses, semiconductors, and metals. Preferable ceramic particles include alumina, silica, zirconia, magnesium oxide, zinc oxide, tin oxide, titanium oxide, indium oxide, lanthanum oxide, yttrium oxide, calcium oxide, silver oxide, and iron oxide; clays and whitewares, such as kaolinite, bentonite, and feldspars; carbides, such as silicon carbide, boron carbide, and tungsten carbide; nitrides such as silicon nitride, aluminum nitride, and boron nitride; titanates, such as barium titanate, lead zirconate titanate, and lead zirconate strontium titanate; ferrites, such as zinc ferrite, manganese ferrite, iron ferrite, cobalt ferrite, nickel ferrite, copper ferrite, magnesium ferrite; manganites, such as manganese manganite and magnesium manganite; hydroxyapatite; calcium phosphate-based ceramics; diamond; and carbon black; and mixtures thereof.

Preferable semiconductor particles include silicon; silicon carbide; III-V semiconducting materials including gallium arsenide, gallium nitride, gallium phosphide, gallium antimide, aluminum antimide, indium arsenide, indium phosphide, and indium antimide; II-VI semiconducting materials including zinc oxide, cadmium sulfide, cadmium telluride, zinc sulfide, cadmium selenide, zinc selenide; and IV-VI semiconducting materials including lead sulfide and lead telluride; and mixtures thereof.

Preferable metal particles include iron, tin, zinc, aluminum, beryllium, niobium, copper, tungsten, silver, gold, molybdenum, platinum, cobalt, nickel, manganese, cerium, silicon, titanium, tantalum, and magnesium mixtures and alloys thereof; metal alloys such as steels and tool steels, stainless steels, plain carbon steels, low carbon steels, aluminum-nickel, brass, bronze; and alloys used for biomedical applications such as cobalt-chromium, cobalt-chromium-molybdenum, cobalt-chromium-tungsten-nickel, cobalt-nickel-chromium-molybdenum-titanium, and titanium-aluminum-vanadium alloys.

In addition to particles, microfibers, including, but not limited to, nylon fibers, glass fibers, carbon fibers, natural fibers, aramid (Kevlar™ and Nomex™) fibers, and mixtures thereof, may also be added to the host material to alter its structure. Various fibers, supports, brackets, and tubes that allow liquid or gaseous fluids to flow to or from the microcapillary device, may also be incorporated into the host material before or after curing, depending on the application. Electrodes may also be incorporated into the host material before or after curing, depending on the application.

Figure 5:
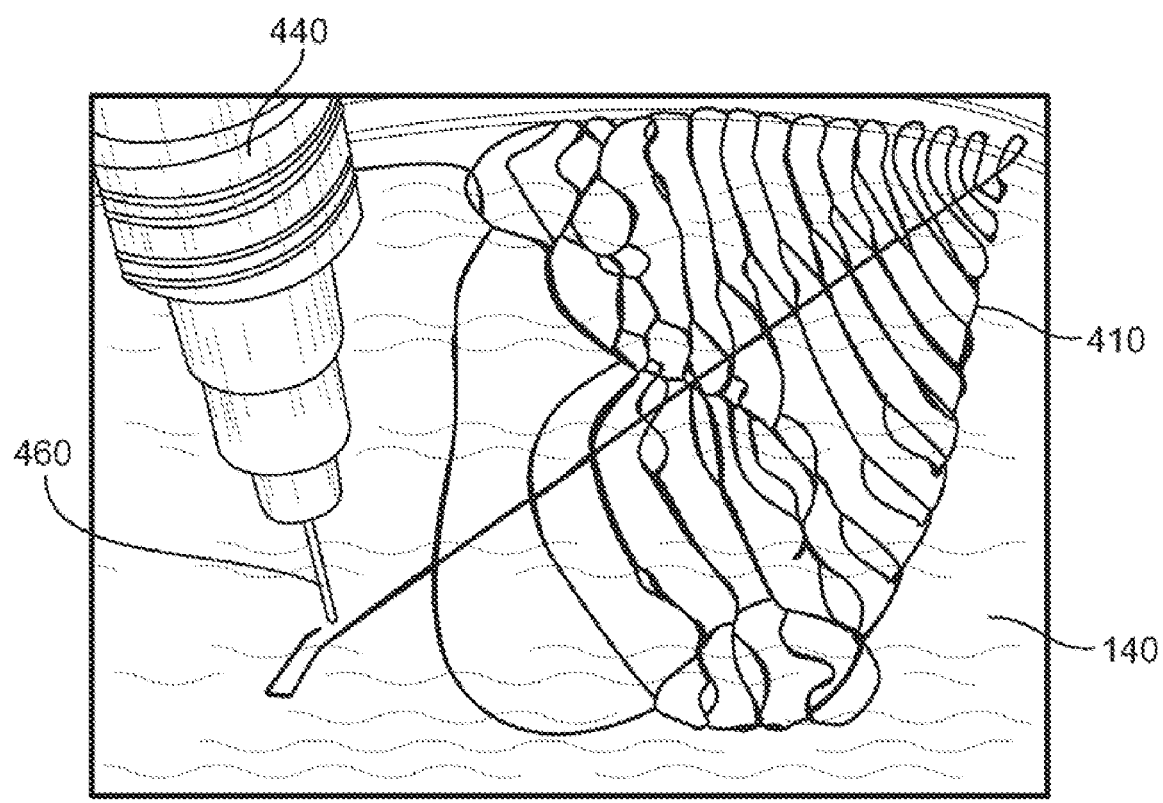
FIG. 5 depicts the formation of a host incorporating aspects of the present invention that was made by depositing the fugitive material filament on the substrate after the uncured host material was applied to the substrate.

As shown in FIG. 5, in another aspect, the uncured host material 140 is applied to the substrate before the fugitive material filament 410 is deposited on the substrate. As the deposition orifice 460 is moved through the uncured host material 140, the filament 410 is extruded. As before, the host material is preferably cured to form the host 150 after the scaffold is complete.

Independent of the application order of the fugitive and host materials, after curing of the host material 140 to form the host 150, the fugitive material scaffold 130 may be removed. Removal is depicted in FIG. 1 and FIG. 2D. FIGS. 6A-6C are time-lapsed photographs of a microcapillary device in accord with the present invention as the fugitive material is removed from the host under vacuum. In FIG. 6A the resultant host is shown with the fugitive material scaffolding in place. FIG. 6B depicts the host after a portion of the fugitive material has been removed from the passageways. FIG. 6C depicts the host after the fugitive material has been substantially removed from the passageways.

While the fugitive material may be removed from the passageways in the host by any method, preferably, the fugitive material is heated and removed under reduced pressure as a liquid. The fugitive material may also be removed from the host by flushing the passageways with warm water or other solvents. When a vacuum is used, the fugitive material is liquefied and a vacuum is applied to at least a first opening in the host. The fugitive material may then be drawn out of the passageway in the host as air is drawn into a second opening in the host. Of course, vacuum, solvent, and other methods may be combined to enhance removal of the fugitive material 450 from the passageways in the host.

During construction of the fugitive material scaffold 130, temperature variance may be used to change the mechanical properties of the fugitive material 450. In a three-dimensional spanning structure, for example, the deposition of the fugitive material filament may be performed at reduced temperature to increase the resistance of the fugitive material to flow. In this aspect, cold temperature is used to harden the scaffold in order to minimize the degree of interconnection that occurs between the passageways.

Similarly, elevated temperatures may be used to reduce the viscosity of the fugitive material during removal. By using fugitive materials demonstrating a temperature dependent viscosity, the degree of interconnection between separate portions of the passageway may be altered. In a preferred aspect, the substrate may be cooled or heated to alter the viscosity of the fugitive material.

Passageway interconnects 115 can be formed in the host wherever a first portion of the fugitive material filament contacts a second portion of a fugitive material filament. Interconnects are formed because the host material does not substantially penetrate an area where filament contact occurs.

The degree of interconnection between a first and second portion of a passageway can be altered by controlling the amount of filament blending at the contact point, as seen for a partially blended interconnect region 315 in FIG. 3. In one aspect, this may be accomplished by altering the viscosity of the fugitive material in relation to temperature. Thus, if little filament blending occurs, the cross-sectional z dimension of the interconnect is preferably a little less than twice the diameter of the contacting portions of the one or more filaments. Similarly, if nearly complete filament blending occurs, preferably from the use of a low viscosity fugitive material, the cross-sectional z dimension of the interconnect will approximate the cross-sectional dimension of the contacting portions of the one or more filaments.

If a low viscosity fugitive material is used, a first filament portion applied atop a second filament portion may fully blend or sink into the second filament portion resulting in a large interconnected area. Such a "fully blended" interconnect area 715 is visible in the two-dimensional microcapillary structure pictured in FIG. 7D. As is seen in the photograph, in this aspect, the locations where the extruded filaments overlapped have joined to form the interconnect 115.

If a higher viscosity fugitive material is used, the interconnected area can be less because the first filament portion may blend or sink into the second filament portion a relatively small amount. In this aspect, the majority of the first filament portion remains above the second filament portion.

Figure 7D:
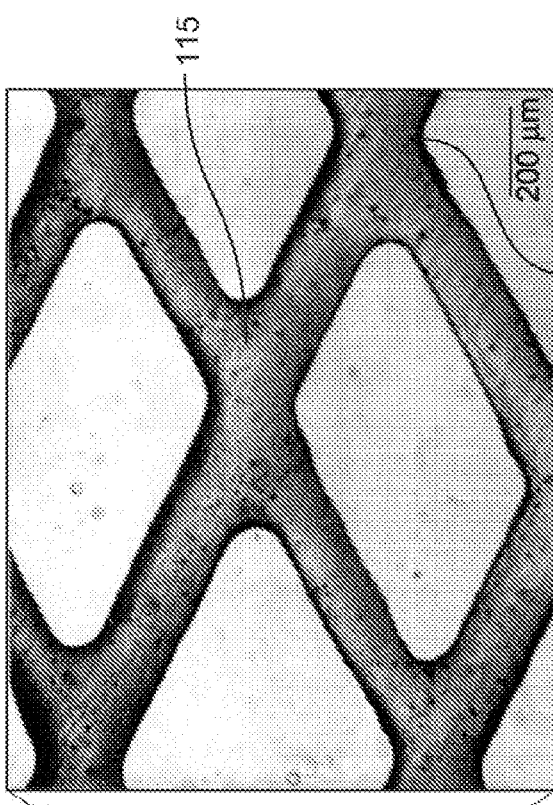
FIGS. 7A-7D show a device having a two-dimensional microcapillary network incorporating aspects of the present invention residing within a host fabricated from an epoxy host material.

Higher viscosity fugitive materials are preferred for constructing three-dimensional scaffolds, such as the structure pictured in FIG. 3C. In this structure the passageways running in the x and y dimensions have not fully blended, but retain a significant amount of the original filament structure at the interconnect region 315. This is clear when the "fully blended" interconnect region 715 of FIG. 7D is compared to the partially blended interconnect region 315 of FIG. 3C.

After removal of the fugitive material 450, a preferred interconnect is formed if enough overlap occurred between the filaments to allow a fluid to flow through the interconnect. As previously stated, the degree of interconnection or filament blending may be controlled by altering the structural integrity or viscosity of the fugitive material.

Benefits of the present fabrication method in relation to conventional methods may include, but are not limited to: the use of a RCD as opposed to lithography; a lithography master is not required; the microcapillary device does not have to be assembled from multiple layers; the microcapillaries may be constructed within any material that can serve as a host material, including structural polymers such as epoxy; the microcapillaries can be made in a single step; manufacturing time may be less than 24 hours, depending on the curing time of the host material.

Two-Dimensional Microcapillary Networks

Figure 7C:
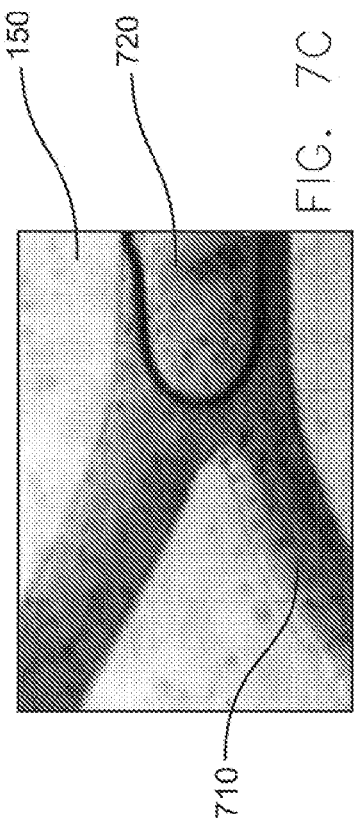
Figure 7A:
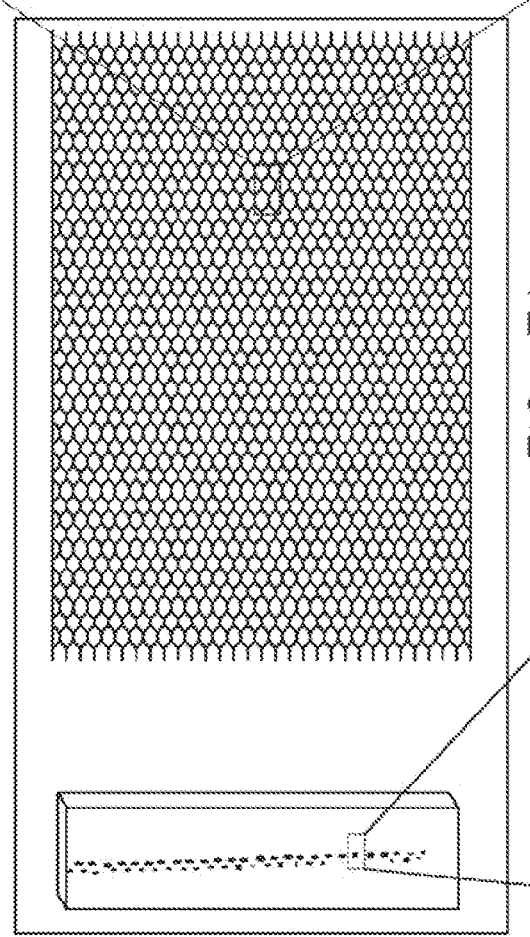

Preferably, two-dimensional microcapillary networks are formed by depositing a lower viscosity fugitive material on a single plane. The height of the RCD deposition head may remain constant during the deposition. FIG. 7A depicts a two-dimensional microcapillary network residing within an epoxy host material. Interconnects may be formed at about 26.5° angles and are separated by about 0.895 mm.

Figure 7B:
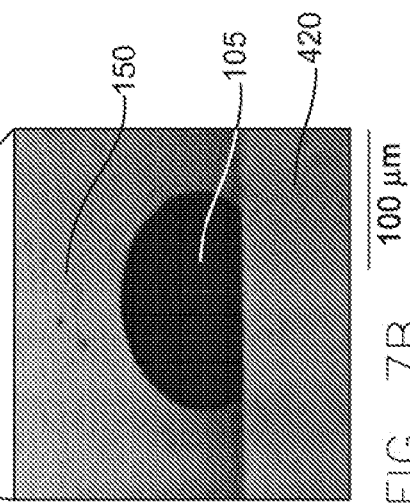

FIG. 7B shows a two-dimensional network passageway having an average cross-sectional diameter of about 135 μm. The depicted passageway has an average width of about 180 μm and an average height of about 90 μm. A syringe equipped with a 100 μm orifice needle was used to deposit the fugitive material filament that resulted in the formation of this passageway. As can be seen from the figure, although some "flattening" occurred where the fugitive material filament contacted the substrate 420, the passageway lacks 90° angles and is substantially tubular. Unlike in conventional microchannel devices, and as can be seen in FIG. 7B, the passageways are not square or rectangular in shape. FIG. 7C shows a top view of the hollow interconnect region of a two-dimensional microcapillary network as a liquid 710 is introduced from the left side of the device, thus forcing air 720 to the right.

Three-Dimensional Microcapillary Networks

In a preferred aspect, three-dimensional networks are made in a similar fashion as two-dimensional networks; however, a more viscous (structurally stronger) fugitive material is used to reduce the amount of interconnection that occurs when fugitive material filaments contact and bridge underlying filaments. If the structural integrity of the fugitive material is too low, the filaments applied atop other filaments could sink into the lower filaments and loose the three-dimensional structure of the scaffold.

Figures 8A, 8B:
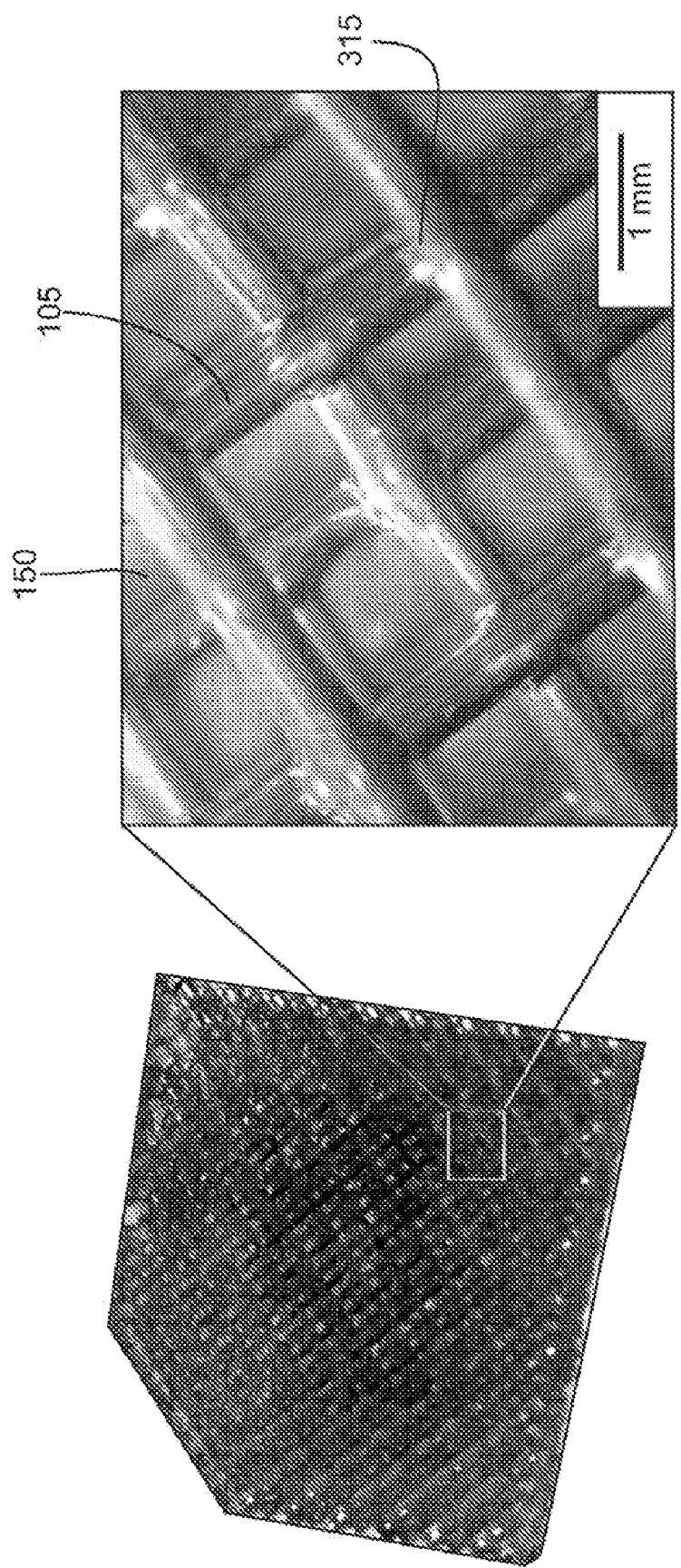
FIGS. 8A and 8B depicts a three-dimensional host incorporating aspects of the present invention.

FIG. 3A depicts a drawing of a three-dimensional microcapillary network. As can be seen from the lower right depiction of a z-axis cross-section, the passageway has multiple interconnects formed where upper and lower passageways contact. FIGS. 3B and 8 are photographs of representative hosts having three-dimensional passageways. FIG. 3C is a photograph of the top of the host showing a cured epoxy host material 140 residing in the interstitial areas of the passageways 105. FIG. 3D is a photograph of a cross-section of the host depicting the substantially tubular nature of the passageways 105. Unlike in the two-dimensional host passageway shown in FIG. 7B, very little "flattening" of the fugitive material is observed due to the increased viscosity of the fugitive material used to form the device of FIGS. 3A-3D and 8.

FIGS. 9A-9C depict a complex three-dimensional fugitive material scaffold incorporating features of the present invention. FIG. 9A is a photograph of a top view of a 16-layer microcapillary scaffold. An epoxy host material can then be infiltrated into the scaffold and cured to give the host shown in FIG. 9B. The fugitive material may then be removed by heating under light vacuum to give a microcapillary network within the host. FIG. 9C depicts a scanning electron microscope image of a cross section of the host after the fugitive material is removed. The substantially tubular nature of the passageways 105 is evident.

Figure 9D:
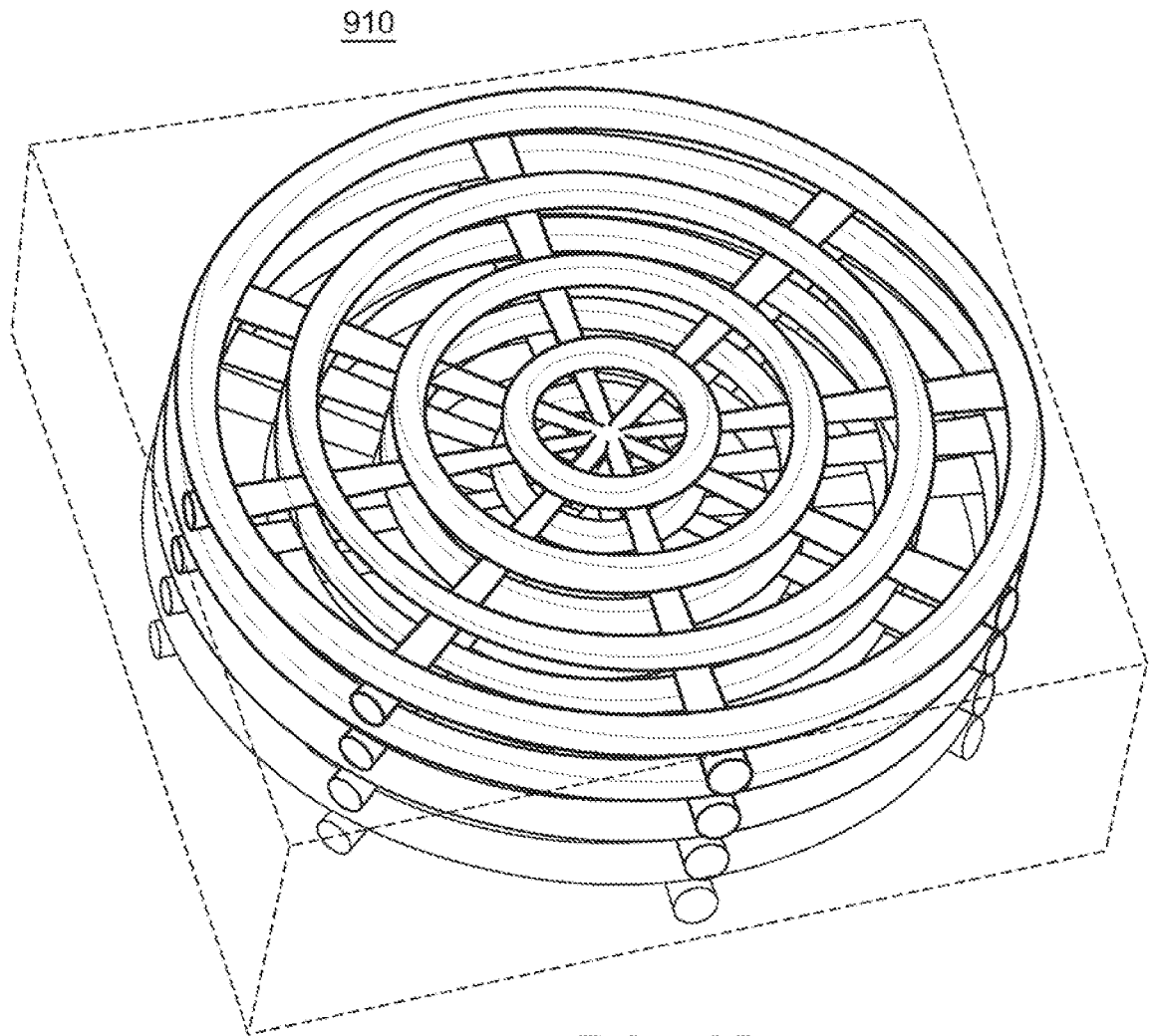
FIG. 9D shows an exemplary structure having a three-dimensional microcapillary network of circular and radial passageways, which incorporates aspects of the present invention.
Figure 9E:
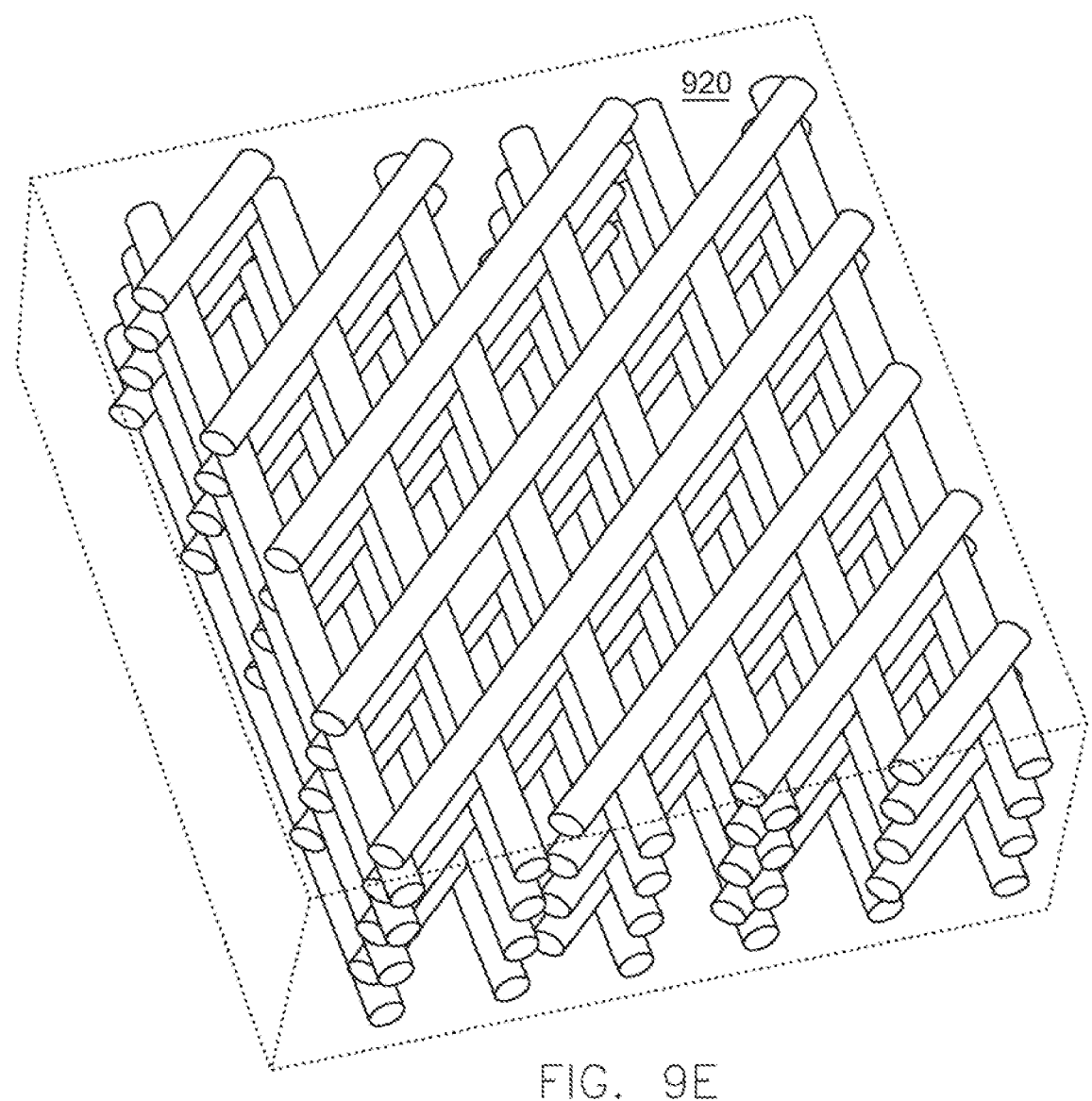
FIG. 9E shows an exemplary structure having a three-dimensional microcapillary network of non-orthogonal 60° passageways, which incorporates aspects of the present invention.
Figure 11A:
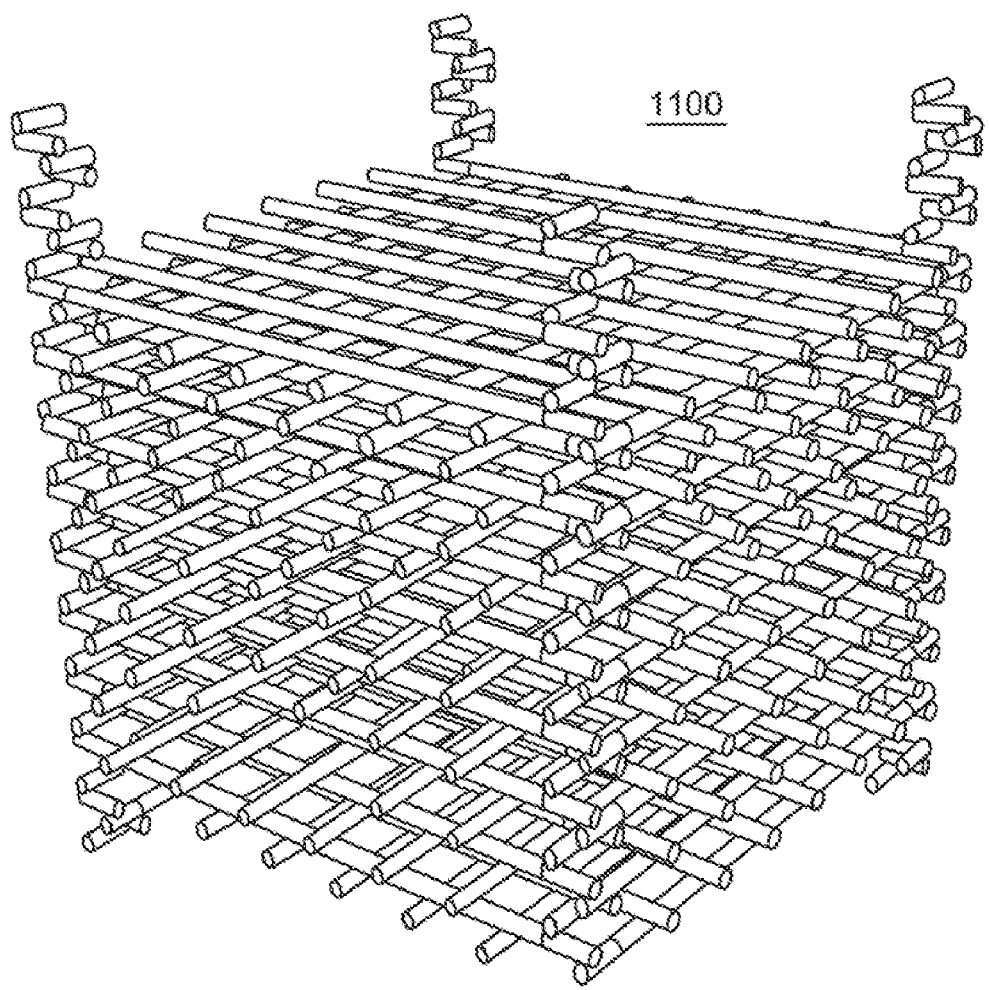
FIG. 11A, 11B, 11C and 11D depicts a 16-layer three-dimensional structure, which incorporates aspects of the present invention.
Figure 11B:
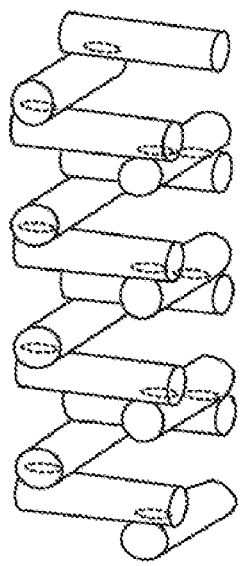
Figure 11C:
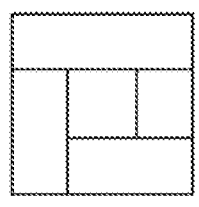
Figure 11D:
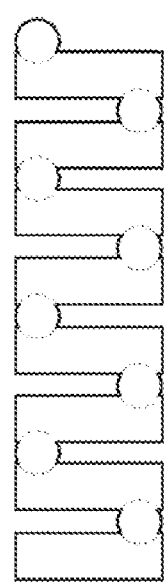

Due to the plethora of fugitive material scaffolds that may be designed using the claimed methods, an almost infinite collection of microcapillary structures are possible. For example, in FIG. 9D an exemplary three-dimensional structure 910 having alternating circular passageways that form interconnects with straight radial arms are shown. Another exemplary structure, similar to the device of FIG. 9A, is depicted in FIG. 9E. However, unlike the FIG. 9A device that has an orthogonal (90°) orientation between successive passageways along the z-axis, the FIG. 9E structure 920 has a 60° orientation between successive passageways.

In another aspect, a microcapillary device may be formed in which a portion of one or more passageways and/or a portion of the interconnects in the host are sealed by a cured resin, as depicted in FIG. 10. By introducing a curable resin 1005 into the host, and selectively curing a portion of the resin, a host having an altered flow pattern may be formed. In a preferred aspect, the host is at least partially filled with a photocurable resin 1005. In an especially preferred aspect, the host is filled with a photocurable epoxy resin, such as Ultraviolet cure adhesive Model 61, Norland Products, Cranbury, N.J.

A portion of the curable resin is then selectively cured in the passageways 105 and/or interconnects 115 of the host. In an especially preferred embodiment, selective curing is performed by placing a patterned mask or photomask 1010 on the host 150 and using light of an appropriate wavelength to cure the portion of the curable resin 1005 below open areas 1015 of the mask 1010. This process is represented in FIG. 10 and can result in selective sealing of passageways and/or interconnects in the host, allowing for additional control over fluid flow within the host. Preferably, the previously cured host material 105 is at least partially transparent to the radiation wavelength used to cure the sealing resin. The uncured resin 1005 may then be removed from the internal portions of the device that were shielded from the light to yield a host incorporating a flow altered microcapillary device.

In one aspect, this flow alteration method is used to produce a host having vertically-oriented, square-spiral, internal mixing towers. In another aspect, a host having vertically-oriented, triangular-spiral, internal mixing towers is formed. In another aspect, hosts having twisted-pipe internal structures may also be formed.

Figure 12A:
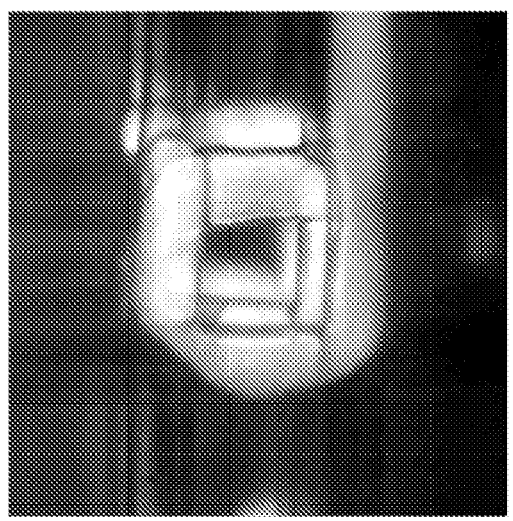
FIGS. 12A-12D show top and side views of the tower structure of a vertically-oriented, square-spiral device, which incorporates aspects of the present invention.
Figure 12B:
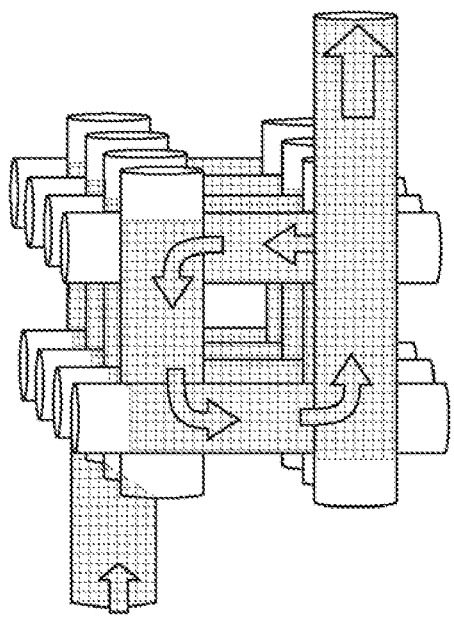
Figure 12C:
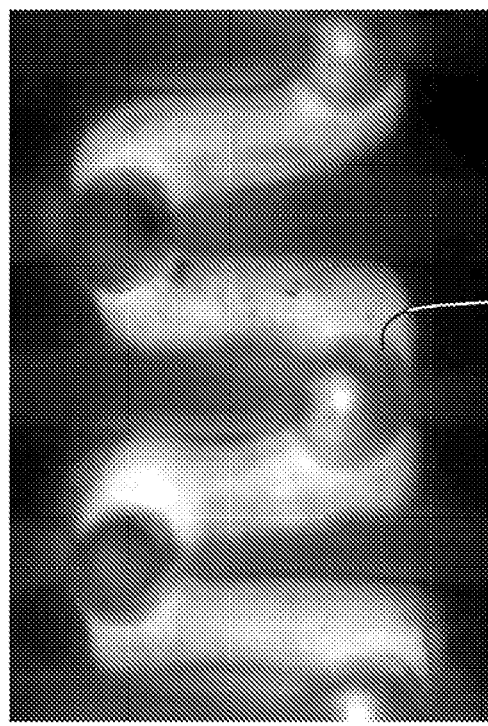
Figure 12D:
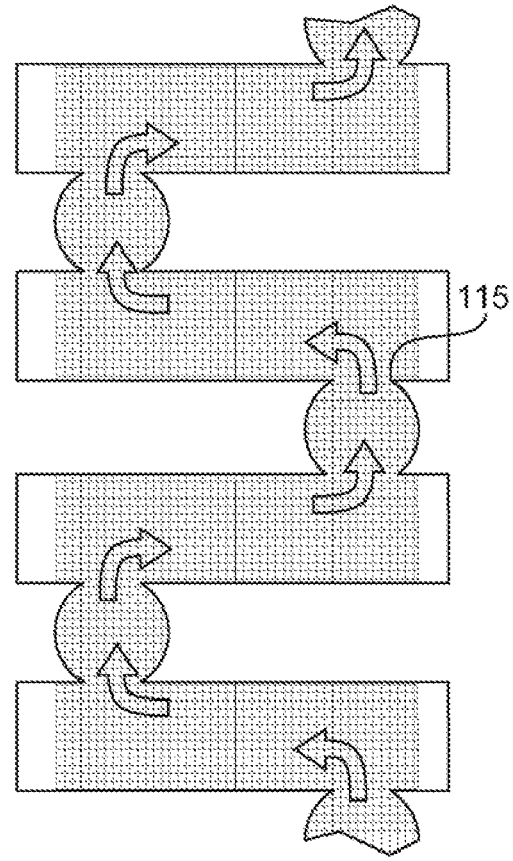

An example of a microcapillary structure 1100 incorporating a vertically-oriented, square-spiral mixing tower is shown in FIG. 11. FIG. 12A is a top-down view of a single square-spiral tower formed by the unsealed passageways and interconnects within the host. FIG. 12C is a side-view of the architecture showing the interconnect regions 115. FIGS. 12B and 12D show top and side views of possible fluid flow patterns within a square-spiral architecture device. The lighter areas to the exterior sides of the darker central area represent passageways sealed by the curable resin. In a preferred aspect, the device incorporating a host of this design is believed to have improved fluid mixing characteristics provided by chaotic advection.

While not shown in the figures, a portion of the passageways and/or interconnects could also be sealed in a host having the exemplary structure of FIG. 9E to yield a triangular-spiral architecture within the host. In relation to the square-spiral architecture of the FIG. 12 device, the passageway turns through which a fluid would flow in a triangular-spiral internally structured host would be sharper. A device containing a host having triangular-spiral internal architecture would likely have enhanced mixing efficiency in relation to the square-spiral device.

Fugitive Materials

Fugitive materials 450 are preferably capable of forming the desired scaffold 130 and being substantially removed from the host 150. As used in the specification and appended claims, substantially removed means that at least 80%, more preferably at least 90%, and in an especially preferred aspect, at least 97% of the total weight of fugitive material used to form the scaffold is removed from the host.

Scaffold fabrication can exploit three desirable properties of the fugitive material: a well-controlled viscoelastic response, the ability to maintain shape during infiltration and curing of the host material, and the ability to undergo a solid-to-liquid phase transition at modest temperature, thus facilitating its removal to form the final microcapillary structure in the resultant host.

Viscoelastic response refers to the combination of the shear-thinning behavior and the viscosity of the fugitive material. Shear-thinning represents the decrease in viscosity of a fluid under shear forces. Thus, good shear-thinning behavior allows the fugitive material to flow from a small orifice during deposition and rapidly "set" to facilitate shape retention of the deposited features.

Preferably, once deposited, the fugitive material has a viscosity high enough to provide the necessary structural support to form and preserve a three-dimensional scaffold, even as the filament spans gaps in the underlying filament layers. Thus, fugitive materials preferred for forming three-dimensional scaffolds are capable of maintaining a three-dimensional shape, without collapse, under deposition conditions.

Fugitive materials having a temperature dependent viscosity are especially preferred. Preferable fugitive materials having temperature dependent viscosity can maintain the complex structure of the scaffold when cold, and liquefy when hot. In one aspect, a preferable fugitive material can extrude from the deposition orifice and have sufficient internal strength to span underlying fugitive material scaffolding while maintaining its shape.

In another preferred aspect, the fugitive material is at least partially transparent to the irradiation wavelength used to cure the host material, if the host material is radiation cured. Thus, if ultraviolet light is used to cure the host material, a preferable fugitive material would be at least partially transparent to ultraviolet light.

Preferred fugitive materials are organic materials with or without inorganic constituents. More preferred fugitive materials include at least 80% nonvolatile components by weight. At present, especially preferred fugitive materials include a majority of organic constituents by weight. Examples of fugitive materials that are especially preferred at present include Prussian blue paste (Loctite™, Rocky Hill, Conn.), petroleum jelly (Vaseline™, Unilever, Englewood Cliffs, N.J.), various lubricants (CIP™, McGlaughlin Oil Co., Columbus, Ohio, for example), and lubricants combined with viscosity modifiers, such as CIP™ Lube containing fumed silica particles. Prussian blue paste can contain 80-85% paraffinic hydrocarbon, 5-10% ferric ferrocyanide, and 1-15% mineral oil. CIP™ lubricant can contain 50-75% white mineral oil, 1-10% aluminum sterate, and 5-20% other constituents.

By mixing various organic materials with inorganic constituents, the viscosity of the fugitive material may be modified. Thus, to achieve the desired viscosity performance of the fugitive material, one or more viscosity modifiers may be combined with one or more base materials, such as Prussian blue paste, petroleum jelly, or lubricants, to give the desired characteristics to the fugitive material.

Preferable viscosity modifiers that may be added to a base material to form fugitive materials include, but are not limited to, porous colloid particles, such as fumed silica (M-5P fumed silica particles, Cab-O-Sil™, Cabot division, Alpharetta, Ga.), calcium complex rods, lithium hydroxystearate fibers, liquid crystals, viscoelastic micelles, low molecular weight polymers (oligomers), glass and polymer beads, polymer and ceramic microcapsules, polymer, ceramic, and metal short fibers. Any one or more of these viscosity modifiers may be combined with an organic containing base, CIP™ Lube for example, to give a fugitive material in accord with the present invention.

A more detailed discussion of the use of calcium complex rods and lithium hydroxystearate fibers to modify an organic containing base composition may be found in Mas, R., and Magnin, A., "Rheology of colloidal suspensions: case of lubricating grease," *Journal of Rheology*, Vol. 38, No. 4, 1994, pp. 889-908, incorporated by reference in its entirety, except that in the event of any inconsistent disclosure or definition from the present application, the disclosure or definition herein shall prevail. A more detailed description of liquid crystals and viscoelastic micelles and their use as viscosity modifiers may be found in Bautista, F., de Santos, J. M., Puig, J. E., and Manero, O., "Understanding thixotropic and antithixotropic behavior of viscoelastic micellar solutions and liquid crystalline dispersions. I. The model." *Journal of Non-Newtonian Fluid Mechanics*, Vol. 80, 1999, pp. 93-113, incorporated by reference in its entirety, except that in the event of any inconsistent disclosure or definition from the present application, the disclosure or definition herein shall prevail.

In one preferred aspect, fugitive materials contain less than 10% by weight and more preferably less than 5% by weight of one or a combination of viscosity modifiers. In an especially preferred embodiment, the fugitive material contains less than 2.5% by weight of one or a combination of viscosity modifiers.

Figure 18:
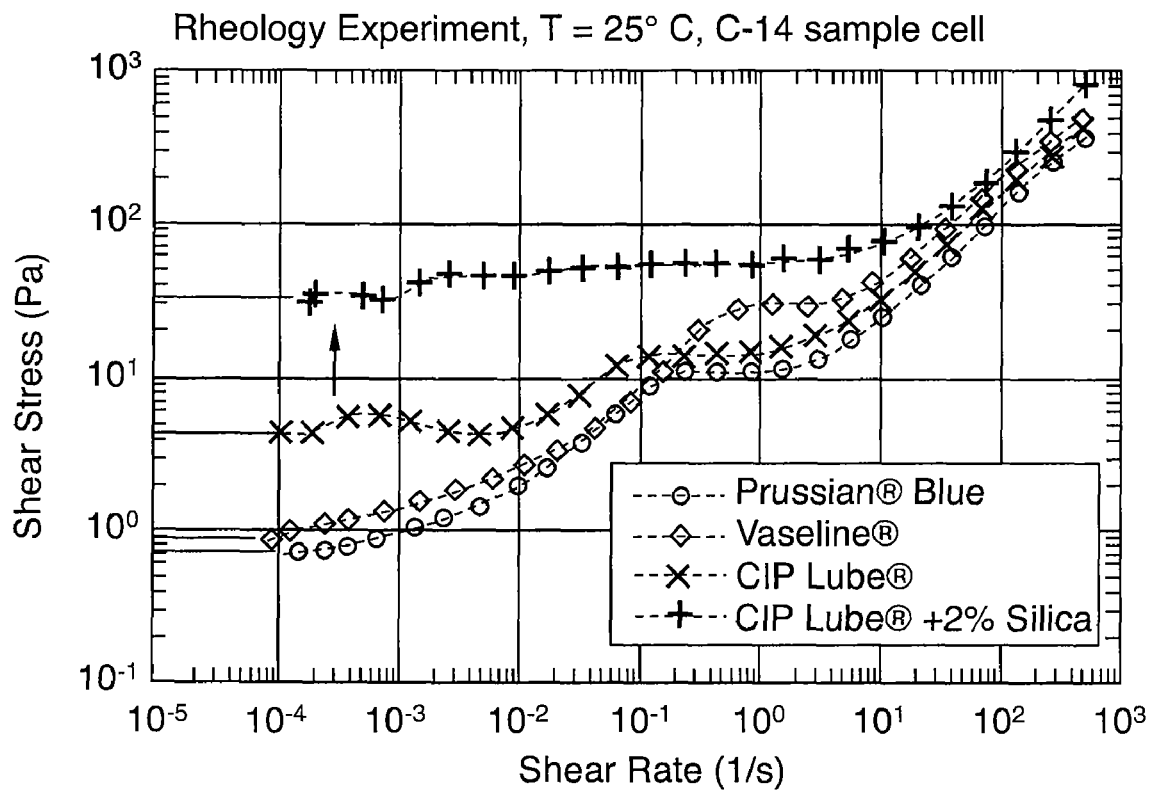
FIG. 18 is a plot of rheological data for various fugitive materials, including a fugitive material that includes a viscosity modifier.

When porous colloidal particles are used as viscosity modifiers, the particles preferably have average diameters from 10 to 30 nm. The addition of porous colloidal particles may be used to modify the stiffness of organic and organic/inorganic compositions to improve their performance as fugitive materials. An example of the improvement obtained in shear stress when a viscosity modifier is combined with an organic containing base is seen in FIG. 18. As seen in the graph, shear stress not only increases, but becomes more uniform as a function of time when CIP™ Lube is modified with about 2% by weight of fumed silica porous colloidal particles.

Figure 13A:
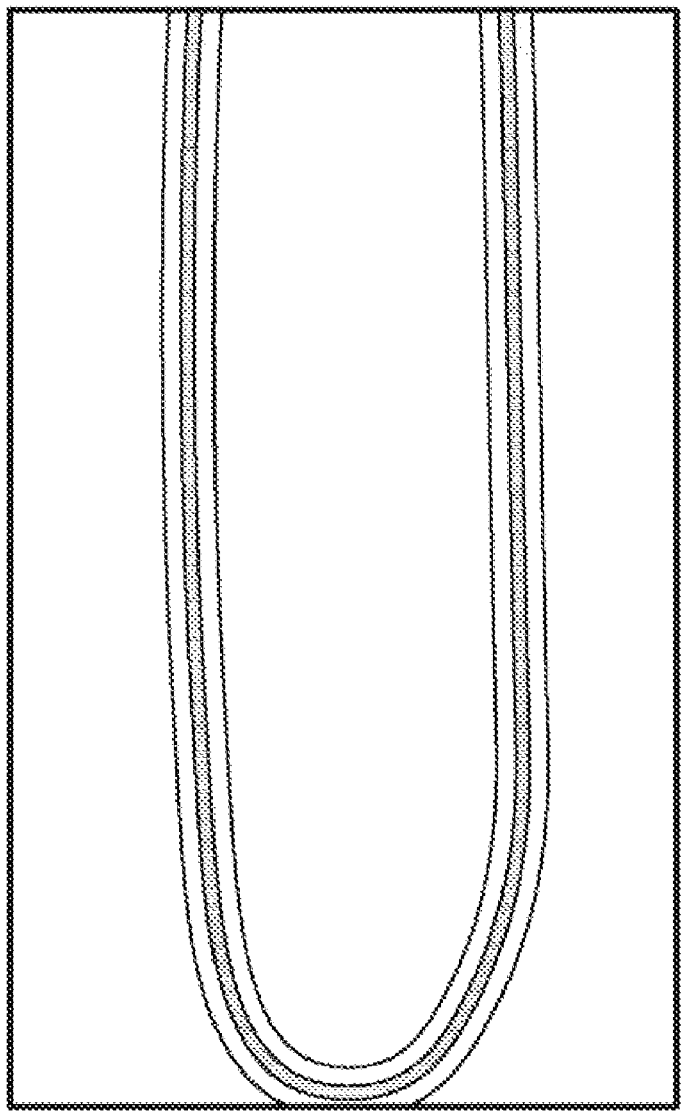
FIG. 13A and 13B depicts a co-extruded fugitive material filament incorporating aspects of the present invention.
Figure 13B:
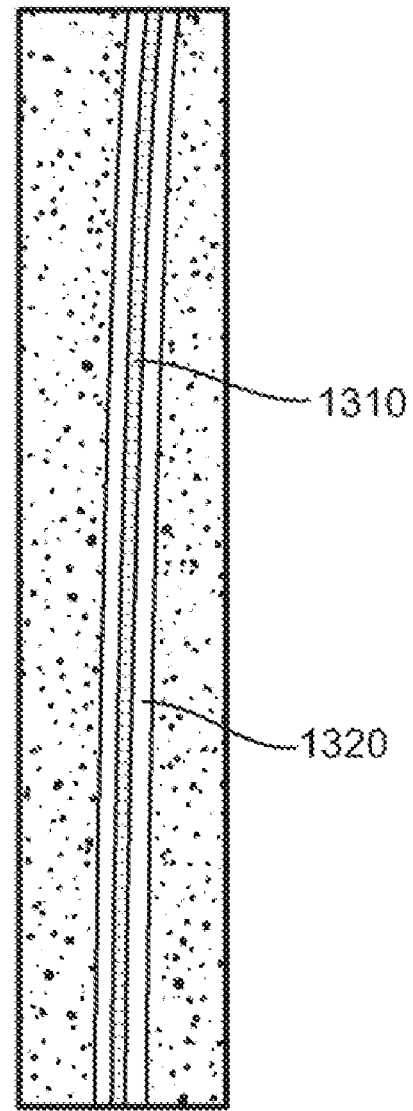

Fugitive materials may also be co-extruded. If an orifice 460 with more than one passageway is used to extrude the scaffolding filament, the filament may include more than one fugitive material, or a fugitive material in combination with a non-fugitive material. For example in FIG. 13, a fugitive material filament is shown having an inner material 1310 of Prussian blue paste and an outer material 1320 of Vaseline™ petroleum jelly. In this way, microcapillary devices may be formed where the viscosities of multiple fugitive materials are used to control interconnection.

In addition to providing additional viscosity control, co-extrusion of a non-fugitive material with a fugitive material, can result in a host having microcapillary passageways that are lined with or have an inner core of a non-fugitive material. For example, if a non-fugitive material, such as a colloidal ink or a pseudoplastic slurry containing ceramic or metal particles, is co-extruded external to the fugitive material, microcapillary passageways that are lined with metal or plastic particles can be formed in the host material when the ink or slurry solidifies. Any desired particles that are compatible with microcapillary device construction can be included in the non-fugitive material. Similarly, if the non-fugitive inks or slurries are co-extruded internal to the fugitive material, their solidified network can remain in the host when the fugitive material is removed.

A more complete discussion of non-fugitive colloidal inks and their uses may be found in Smay, J. E., et al., Colloidal Inks for Directed Assembly of three-dimensional Periodic Structures, *Langmuir*, 18, 5429-37 (2002), incorporated by reference in its entirety, except that in the event of any inconsistent disclosure or definition from the present application, the disclosure or definition herein shall prevail. A more complete discussion of non-fugitive pseudoplastic slurries and their uses may be found in U.S. Pat. No. 6,027,326, incorporated by reference in its entirety, except that in the event of any inconsistent disclosure or definition from the present application, the disclosure or definition herein shall be deemed to prevail.

Representative Applications

As previously stated, microchannel-type devices, such as the claimed microcapillary devices and hosts, have many uses, including biotechnology, self-healing materials, sensors, chemical reactors (lab-on-a-chip), and fluidic-based computers. Liquids alone or liquids containing solids, such as biomolecules, DNA, RNA, proteins, organic materials, inorganic materials, and combinations thereof may be mixed in the claimed microcapillary devices. A more detailed description of the use of microchannel-type devices as microfluidic devices in biomedical and in biotechnology applications may be found in Burns, M. A., et al., An integrated nanoliter DNA analysis device. *Science* 282, 484-487 (1998); Chou, H.-P., et al., A microfabricated device for sizing and sorting DNA molecules. *Proc. Nat. Acad, Sci.* 96, 11-13 (1999); Strömberg, A., et al., Microfluidic device for combinatorial fusion of liposomes and cells. *Anal. Chem.* 73, 126-130 (2001); and Choi J.-W., et al., An active microfluidic mixer for mixing of microparticles and liquids. *SPIE Proceedings* 4177, The International Society for Optical Engineering, 154-161 (2000).

The claimed microfluidic devices can also form the capillary network within a polymer or composite material that allows for automated repair. In this application, a microcirculatory system may be incorporated into the material to replenish the supply of healing agent and catalyst to the material.

For example, if an airplane wing contains microfluidic capillaries (passageways and interconnects) that contain a liquid material that cures on exposure to air, a crack in the wing can be automatically repaired when the liquid material oozes from the channels and fills the crack. Such self-healing (autonomic) materials may be used in airplane components, space vehicles, satellites, surface and subsurface water craft, buildings, and bridges, for example. In spacecraft, for example, the liquid material could cure on exposure to radiation. In watercraft, for example, the liquid material could cure on exposure to water. A more detailed discussion of self-healing materials may be found in White, S. R., et al., Autonomic healing of polymer composites. *Nature* 409, 794-97 (2001).

By using multiple deposition orifices, the claimed microfluidic hosts can be formed within coatings on a large scale. For example, a large metal or composite plate may be coated with a microfluidic device. In one aspect, a RCD having a plurality of deposition heads may be used to form a scaffold from a fugitive material on the steel plate. Depending on the size of the plate, 100's of deposition orifices may be utilized. The plate and the scaffold may then be covered by a coating, such as epoxy containing paint. The fugitive material may then be removed to leave a periodic structure in the coating. The periodic structure may be tuned to adsorb radiation at one or more wavelengths.

Microfluidic hosts may also be incorporated into sensor devices or devices used as miniature chemical reactors, as discussed in Chabinyc, M. L., et al., An integrated fluorescence detection system in poly(dimethylsiloxane) for microfluidic applications. *Anal. Chem.* 73, 4491-4498 (2001); Losey, M. W., et al., Microfabricated multiphase packed-bed reactors: characterization of mass transfer and reactions. *Ind. Eng. Chem. Res.* 40, 2555-2562 (2001); and Jeon, N. L., et al., Generation of solution and surface gradients using microfluidic systems. *Langmuir* 16, 8311-8316 (2000), for example. By selectively sealing portions of the passageway and interconnects within the host, various fluids and reagents may be directed to specific locations within the host. By equipping the device with electrodes prior to or after curing of the host material, an electric potential may be used to direct charged reagents. Furthermore, microfluidic devices have also been used as the basis for computers as described in Moore, S. K., Microfluidics for complex computation. *IEEE Spectrum* 38, 28-29, (2001).

The preceding description is not intended to limit the scope of the invention to the preferred embodiments described, but rather to enable a person of ordinary skill in the art of microchannel-type device fabrication to make and use the invention. Similarly, the examples below are not to be construed as limiting the scope of the appended claims or their equivalents, and are provided solely for illustration. It is to be understood that numerous variations can be made to the procedures below, which lie within the scope of the appended claims and their equivalents.

EXAMPLES

Example 1

Fabrication of One- and Two-Dimensional Microcapillary Networks

Straight passageway (one-dimensional) and square-wave channel (two-dimensional) microfluidic devices were fabricated by robotically depositing an optically clear lubricant (CIP™ Lube, McGlaughlin Oil Company) onto a glass cover slide. The CIP™ Lube was housed in a syringe (barrel diameter=4.6 mm, EFD Inc.) and deposited through a cylindrical nozzle (diameter, D=150 µm) at a constant deposition speed (v) of 6 mm/s.

The one-dimensional and two-dimensional passageway hosts consisted of a single layer pattern of a 45° Y-junction connected to a 17-mm long straight channel or a 15 mm long square-wave channel with seven C-turns (size ~0.5 mm), respectively. The total build time was approximately 60 seconds for each patterned feature.

Three rubber tubes were then placed at the two inlet and one outlet nodes associated with each scaffold. The tubes were filled with the fugitive material to ensure their connections to the deposited scaffold. The scaffolds were encapsulated with the epoxy resin (2.5:1 epoxide to aliphatic amine curing agent) and cured at 22° C. for 24 h and 60° C. for 2 h to form a host. At 60° C. the fugitive material was removed from the host under a light vacuum.

Example 2

Fabrication of a Three-Dimensional Microcapillary Scaffold

A three-dimensional, fugitive material scaffold in accordance with the present invention was made by the following procedure. The three-dimensional scaffold was fabricated using a robotic deposition apparatus (Model JL2000, Robocasting Enterprises, Inc., Albuquerque, N.M.). This direct-write technique employed an ink delivery system mounted on a z-axis motion control stage for agile printing onto a moving x-y stage. Three-axis motion was independently controlled by a custom-designed, computer-aided direct-write program (RoboCAD 2.0) that allowed for the construction of three-dimensional scaffolds in a layer-wise deposition scheme.

An organic ink (Prussian blue paste, Loctite®D, Rocky Hill, Conn.) was housed in a syringe (barrel diameter=4.6 mm, EFD Inc., East Providence, R.I.). The ink was deposited through a cylindrical nozzle (diameter, D=200 µm) at a volumetric flow rate (=0.25 $\pi D^2 v$) required to maintain a constant deposition speed (v) of 15 mm/s.

A two-dimensional pattern of cylindrical rods was created with an inter-rod separation distance of 1.25 mm. After a given layer was generated, the stage was incremented in the z-direction (z=170 µm=0.85 D) and another layer was deposited with a 90° rotation and 0.5 mm planar shift from the underlying layer. This process was repeated until the desired three-dimensional (16-layer) scaffold was created. The total build time for a given three-dimensional structure was approximately 180 seconds.

Example 3

Fabrication of a Three-Dimensional Microcapillary Network

The fugitive material scaffold from Example 2 was placed in a Petri dish and cooled on a dry ice and acetone bath (−70° C.). The scaffold was then infiltrated with a liquid resin consisting of 2.5:1 epoxide (EPON 828, Shelf Chemicals) to aliphatic amine curing agent (EPI-CURE 3274, Shell Chemicals). The resin was cured at 22° C. for about 24 h and then at 60° C. for about 2 h to form the host. At 60° C., the scaffold liquefied and was removed from the host under a light vacuum yielding the desired microcapillary network of interconnected, substantially tubular passageways.

Example 4

Fabrication of a Three-Dimensional Microcapillary Network Having a Vertically-Oriented, Square-Spiral Internal Architecture A photosensitive monomer (Model 61, Norland Products) was infiltrated into the microcapillary network of Example 3. This structure was then masked and selected channels were photopolymerized by UV curing for about 60 s. The photomask was generated by printing the desired pattern on a transparency using a high-resolution printer (5,080 dpi). A filtered UV light source (U-MNUA, type BP360-370) was mounted on an Olympus Epi-fluorescent microscope (BX-60). Uncured monomer was removed under a light vacuum.

Example 5

Fluid Mixing Experiments in One-, Two-, and Three-Dimensional Devices

Mixing experiments were carried out in the one-dimensional, two-dimensional, and three-dimensional microfluidic devices described above by simultaneously flowing two aqueous fluids containing red or green fluorescent dyes (0.60 mg/ml of $H_2O$, Bright Dyes). Mixing efficiency was characterized by measuring the yellow color intensity produced upon fluid mixing using a fluorescence light microscope (Zeiss Axiovert 100, Carl Zeiss). The images were captured through a triple excitation filter (360/480/560) attached to a color CCD camera controlled with MCID software (MCID v.6, Imaging Research). The fluids were housed inside 10 cc syringes mounted side-by-side on a syringe pump (PHD 2000, Harvard apparatus).

In the three-dimensional device, the fluids were attached to Microfil® syringe tips (Microfil®, World Precision Instruments) previously inserted in the two inlet pore channels (diameter ~230 µm) and sealed. For the one-dimensional and two-dimensional devices, the syringes were directly connected to the passageways via the tubing inserted prior to host material infiltration. For each mixing experiment, the device was placed on the specimen stage of the fluorescent microscope and the two inputs were connected to the syringes containing the red and green fluorescent fluids, while the output was linked to a waste reservoir. The syringe pump was set to the desired flow rate (0.1-45 ml/h) and the mixing behavior was then observed. All fluorescent images were captured under steady-state conditions (>180 s). Image processing was performed with Photoshop (Photoshop v.6, Adobe) for color filtering and MCID (MCID v.6, Image research) for pixel intensity measurements.

Example 6

Fluid Mixing in a Three-Dimensional Device Having Vertically-Oriented, Square-Spiral Mixing Towers was Compared to That of One-Dimensional and Two-Dimensional Devices The mixing efficiency of the three-dimensional square-spiral towers (shown in FIG. 14C) was characterized by monitoring the mixing of two fluid streams (red and green) using fluorescent microscopy as a function of varying Re ~0.15-70. Re is the Reynolds number (Re=Ul/v) where U is the average flow speed, l is the characteristic cross-sectional dimension of the channel, and v is the kinematic viscosity of the fluid. The value is a dimensionless ratio of inertial to viscous forces. In general, higher Re values correspond to faster fluid flow rates through the device. For comparative purposes, fluid mixing was also characterized in two alternate microfluidic devices: a straight (one-dimensional) passageway (FIG. 14A) and a square-wave (two-dimensional) passageway (FIG. 14B). After the two fluid streams come into contact, the red and green fluorescent dyes begin to diffuse resulting in the formation of a yellow (mixed) fluid layer. Mixing is believed to occur solely by molecular diffusion in the one-dimensional device, which serves as a benchmark for evaluating mixing efficiency of both the two- and three-dimensional devices.

Figure 15:
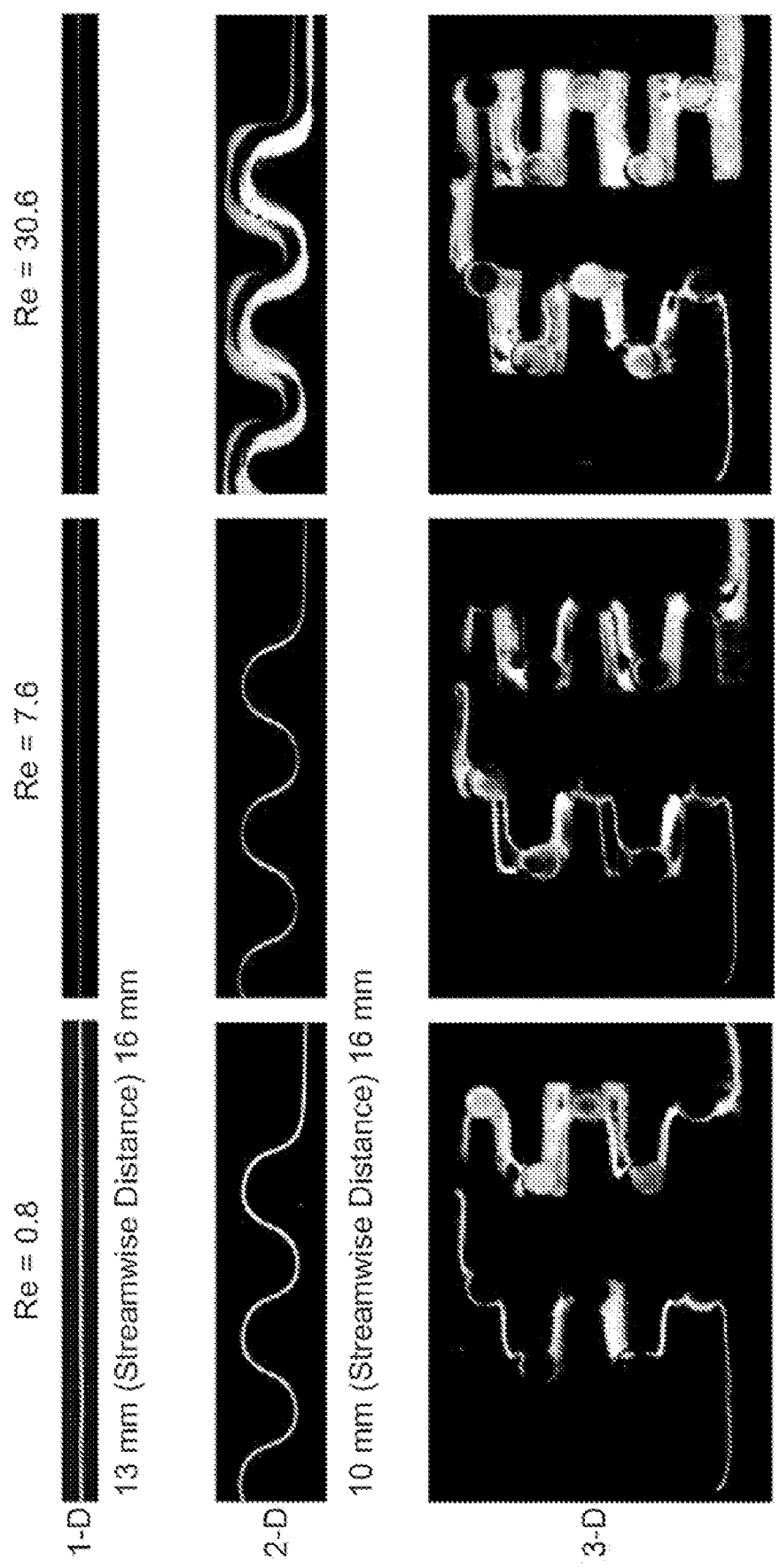
FIG. 15 depicts mixing patterns in devices including hosts having one-, two-, and three-dimensional passageways, which incorporate aspects of the present invention.

Optical images of the one-, two-, and three-dimensional microfluidic devices at representative low (Re<1), intermediate (1<Re<10), and high Re (>10), are shown in FIG. 15. A thin zone of mixed (yellow) fluid was observed at the center of the one-dimensional channel, whose width decreased with increasing Re due to a corresponding decrease in residence time at higher flow rates.

At low and intermediate Re, a central zone of mixing appeared in the two-dimensional device that followed the contour of the square-channel array. At high Re, the mixing zone appears to undulate from the channel walls as fluid traverses through the array, at times filling the entire channel cross-section. The appearance of multiple mixing zones across the channel cross-section is indicative of transverse flow that twists and folds the fluid interface.

In the three-dimensional device, this behavior was apparent even at low Re as the fluid stream is constantly reoriented by passing from segment to segment (90° turns) within the square-spiral towers. At intermediate Re the filtered image reveals increasing complexity in the flow domain with the appearance of multiple mixing zones and striations across the channel cross-section. At large Re the mixing process occurred rapidly, and a fully mixed stream was achieved shortly after entering the second spiral tower.

Figure 16:
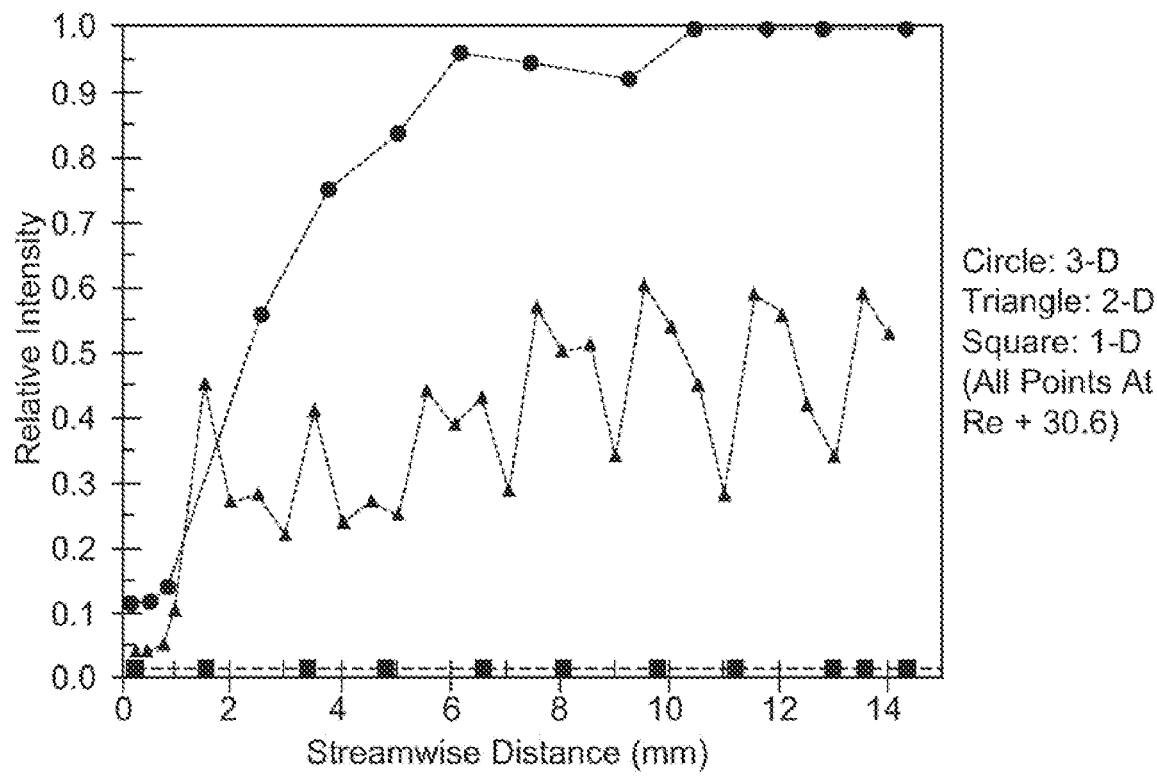
FIG. 16 is a plot of relative mixing intensity versus the streamwise distance of the passageway in millimeters for representative one-, two-, and three-dimensional devices.

To quantify the degree of mixing, the average yellow intensity [I] was measured across the channel and compared to the intensity obtained when the two fluids were completely mixed $\langle I_{mix}\rangle$ prior to their introduction to the channel. The relative intensity $\bar{I}=\langle I\rangle/\langle I_{mix}\rangle$, where $\langle\rangle$ denotes the average taken over all pixels imaged in a given microchannel segment, ranges from 0 (unmixed) to 1 (fully mixed). $\bar{I}$ is plotted as a function of streamwise distance in FIG. 16 for each microfluidic device at Re=30.6. The figure shows that the three-dimensional (3-D) device had superior mixing performance to its one-(1-D) and two-dimensional (2-D) counterparts.

Diffusive mixing was the dominant mechanism observed for the one-dimensional straight passageway at all Re values considered as well as the two-dimensional square-wave passageway in the Stokes flow regime (Re<1). The growth of the mixed zone normal to the flow direction (i.e., the radial dispersion) scaled as $\sqrt{Dt}$ (where D=1.67×10$^{-6}$ cm$^2$/s), or as $x^{1/2}$ for steady flow conditions where x is the streamwise distance. A more detailed discussion of streamwise distance can be found in Jones, S. W., Interaction of chaotic advection and diffusion. *Chaos Applied to Fluid Mixing*, Aref, H. and El Naschie, M. S., eds., 185-196 (1995). Mixing was found to markedly improve relative to diffusion alone for both the two-dimensional square-wave passageway at high Re and in the three-dimensional square spiral towers over the studied Re values. The oscillatory nature of the $\bar{I}$ data is believed to reflect the folding and twisting of the fluid interface as it is advected along a given channel within such structures.

Viewing the two-dimensional device from above, it appears that the mixed interface undulates across the channel when the streamlines periodically act to spin the interface into a planar profile. In the Stokes flow regime, these oscillations are greatly exaggerated for the three-dimensional device owing to the higher degree of twisting and folding of the mixing interface as the fluid stream negotiates each approximately 90° turn within the tower. At higher Re, these oscillations are damped and complete mixing occurs rather quickly, within about 45 msec. (or a streamwise distance of 6 mm) at Re ~30.

Figure 17:
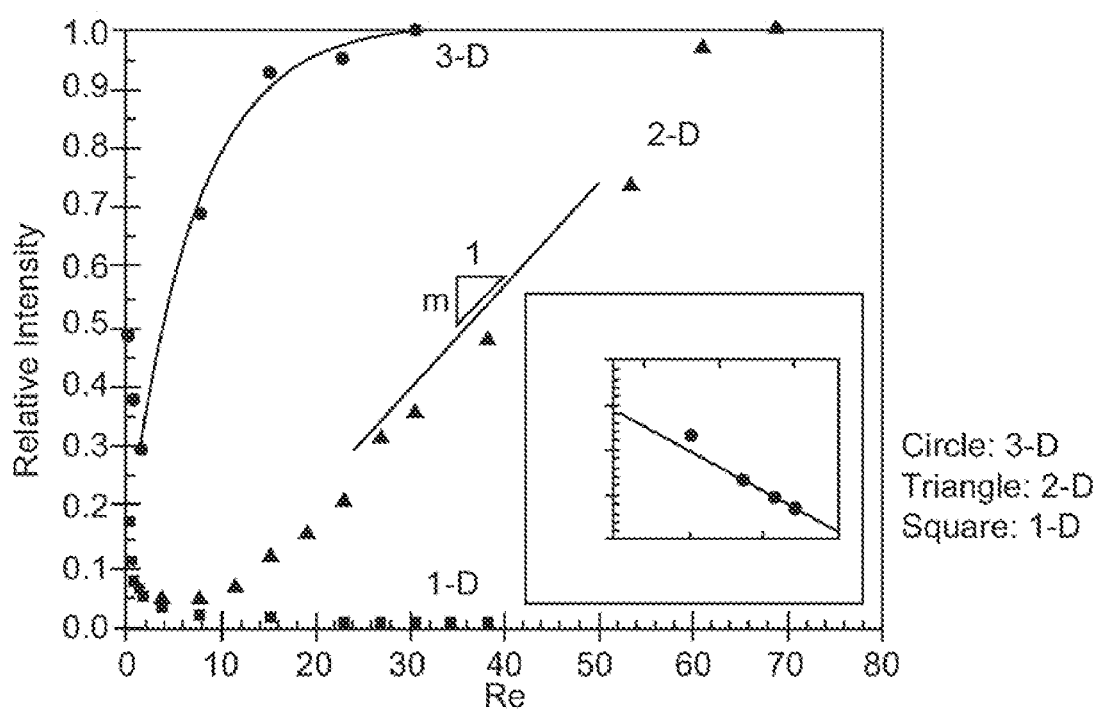
FIG. 17 is a plot of relative mixing intensity versus Re for representative one-, two-, and three-dimensional devices.

The relative intensity $\bar{I}$ is plotted as a function of Re in FIG. 17 for each microfluidic device. These data are reported at a constant streamwise distance of 14 mm, which corresponds to the outlet of the second tower of the three-dimensional device. The degree of mixing arising solely from diffusion under pure laminar flow conditions (one-dimensional case) decreased rapidly with increasing Re, as the residence time was reduced within the passageway. Mixing in the two-dimensional device was diffusion dominated at low Re before increasing linearly above Re ~10. Complete mixing was not observed for the two-dimensional device until Re ~70. The mixing performance for the three-dimensional microfluidic device was characterized by two distinct regimes. At low Re, diffusive mixing dominated leading to a decrease in relative intensity as Re increased from 0.15 to ~1.0. It should be noted that this tower geometry led to an approximate two-fold enhancement of mixing at Re=0.15 relative to either the one-dimensional or two-dimensional case under the same conditions. At Re 1, a transition in behavior was observed and mixing was thereafter increasingly dominated by what was believed to be chaotic advection. Above this transition, mixing was greatly accelerated and nearly complete mixing was achieved at Re>15.

While complete mixing remained diffusion-limited (i.e., occurring over the diffusive length scale $l_D \approx (D_{mol}t)^{1/2}$), chaotic advection was thought to have stretched and folded the fluid interface into long tendrils with the flow domain consisting of interwoven striations of the two fluids. The separation distance between the striations for a steady, chaotically advecting flow will decrease exponentially with streamwise time distance along the tower (cf. $l_{sep} \approx 2A/l_0 \exp(\lambda t)$ for the time-dependent case, where A is the area of the flow domain, $l_0$ is the initial perimeter of the mixing two-fluid interface, and λ is the Lyapunov exponent of the advecting flow). A homogenous mixture may be obtained when the striation separations and the diffusion length are comparable. The relative intensity approached unity (fully mixed) at an exponential rate for the three-dimensional square-spiral towers above this transition (see FIG. 17), since the time scale for homogenization grows with natural log of the Péclet number (i.e., $t_{hom} \propto \ln(Pe)$). Such observations are taken as strong evidence for the dominance of chaotic advection in this regime.

Example 7

Preparation of a Fugitive Material Using Porous Colloidal Particles

For fugitive materials, the yield stress ($\tau_y$) was identified as an important parameter for the deposition of a three-dimensional scaffold having spanning filaments. This parameter corresponds to the shear stress at low shear rate. To increase yield stress of a lubricant, M-5P fumed silica particles (Cab-O-Sil® Cabot division) were added to the CIP Lube® lubricant. A yield stress increase of approximately one order of magnitude was measured for a mixture of lubricant with 2% by weight silica particles. In addition, no intermediate plateau was observed for the shear stress value during the monotonic increase with increasing shear rate. These results demonstrate that even at low volume fractions, the addition of nanoscale reinforcements can significantly impact the rheological properties of organic materials.

Figure 19:
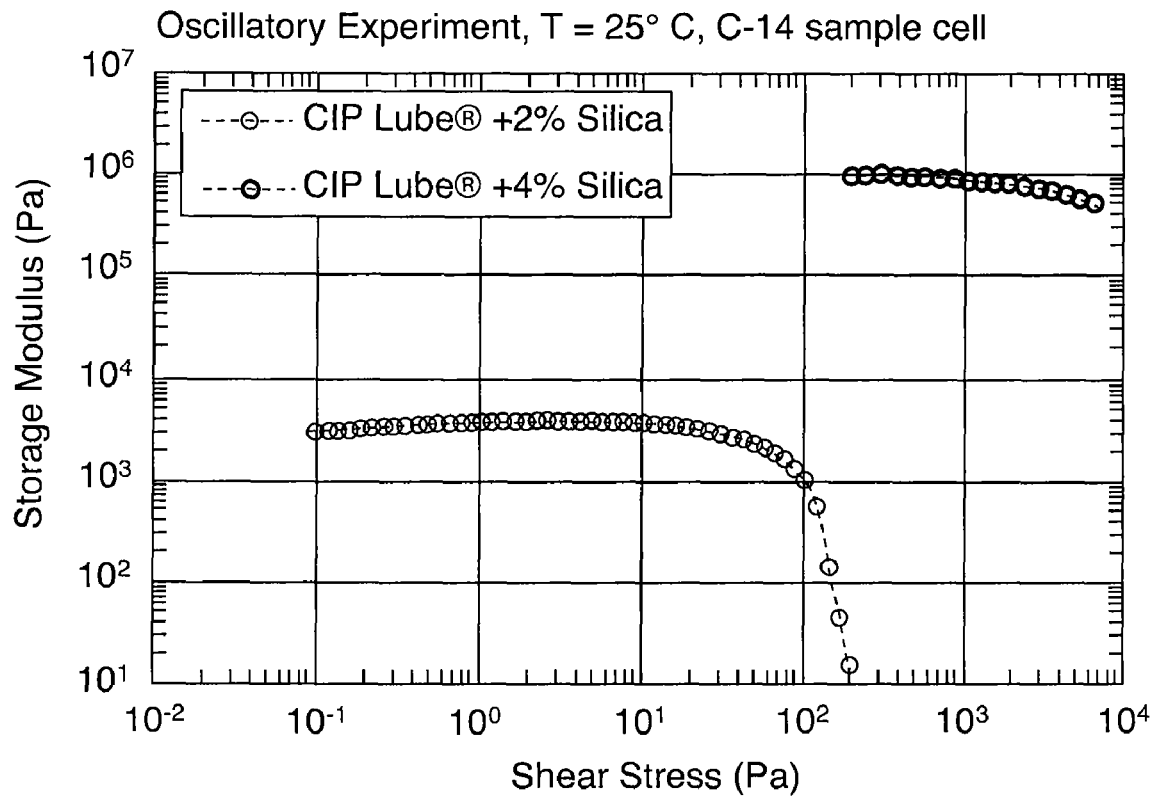
FIG. 19 is a plot representing the shear stress of a fugitive material modified with fumed silica at the 2% and 4% concentration by weight.

Also, oscillatory experiments were performed at room temperature on CIP Lube® lubricant with 2% and 4% (wt) fumed silica particles. The measured shear storage modulus (G') as a function of shear stress is presented in FIG. 19. At 2% (wt) particle concentration, the shear storage modulus shows a low stress plateau value of about 3 kPa. Softening begins to occur above 20 Pa until dropping precipitously above 100 Pa shear stress. This drastic reduction in storage modulus corresponds to the yield stress ($\tau_y$) of the material and the end of the elastic regime. At 4% (wt) particle concentration, the shear storage modulus plateau is much higher (~1 MPa) and extends to a much higher shear stress range ($\tau$~100-1,000 Pa). Based on these results, a two orders of magnitude increase in storage modulus was obtained by doubling the volume fraction of added particles.

As any person of ordinary skill in the art of microchannel-type device fabrication will recognize from the provided description, figures, and examples, that modifications and changes can be made to the preferred embodiments of the invention without departing from the scope of the invention defined by the following claims and their equivalents.

What is claimed is:

1. A device comprising:
a first layer of extruded filament comprising fugitive material, wherein the first layer of extruded filament forms a first passageway and a second passageway, and wherein a first gap is formed between the first passageway and the second passageway;
a second layer of extruded filament comprising the fugitive material, wherein the second layer of extruded filament is on the first layer of extruded filament and spans the first gap, and wherein the second layer of extruded filament forms a third passageway; and
a host encapsulating at least a portion of the first and second layers of extruded filament, wherein the host comprises an epoxy resin and the fugitive material comprises petroleum jelly.

2. The device of claim 1, further comprising:
a first interconnect formed at the intersection of the third passageway and the first passageway; and
a second interconnect formed at the intersection of the third passageway and the second passageway, wherein the first and second interconnects connect the first and second passageways to the third passageway.

3. The device of claim 1, wherein the host comprises a photosensitive monomer.

4. The device of claim 1, wherein the host comprises an ultraviolet cure adhesive.

5. The device of claim 1, wherein the first layer of extruded filament further comprises hydrocarbons.

6. The device of claim 1, wherein the first layer of extruded filament further comprises at least one of hydrocarbons and mineral oil.

7. The device of claim 2, wherein the first passageway has an average width from 0.1 microns to 1000 microns.

8. The device of claim 1, wherein the first passageway has an average width from 10 microns to 500 microns.

9. The device of claim 1, wherein the first passageway has an average width from 50 microns to 250 microns.

10. The device of claim 1, wherein the longest cross-sectional dimension of said first interconnect is less than 2.5 times the average width of said first passageway.

11. The device of claim 1, wherein said host is substantially homogeneous throughout.

12. The device of claim 1, further comprising: a substrate, wherein the first layer of extruded filament is on the substrate.

13. The device of claim 12, wherein the substrate comprises at least one of glass and plastic.

14. The device of claim 12, wherein the substrate comprises glass.

15. The device of claim 12, wherein the substrate is planar.

16. The device of claim 1, further comprising from two to one-hundred layers of extruded filament.

17. The device of claim 1, wherein the second passageway is a distance D1 from the first passageway.

18. The device of claim 17, wherein the distance D1 is less than 500 microns.

19. A device comprising:
a substrate;
a first layer of extruded filament comprising fugitive material, wherein the first layer of extruded filament is on the substrate, wherein the first layer of extruded filament forms a first passageway and a second passageway, wherein a first gap is formed between the first passageway and the second passageway, and wherein the fugitive material comprises petroleum jelly;
a second layer of extruded filament comprising fugitive material, wherein the second layer of extruded filament is on the first layer of extruded filament and spans the first gap, wherein the second layer of extruded filament forms a third passageway, and wherein the fugitive material comprises petroleum jelly; and
a host encapsulating at least a portion of the first and second layers of extruded filament, wherein the host comprises an epoxy resin.

20. A device comprising:
a first layer of extruded filament comprising a viscoelastic fugitive material, wherein the first layer of extruded filament forms a first passageway and a second passageway, and wherein a first gap is formed between the first passageway and the second passageway;
a second layer of extruded filament comprising the viscoelastic fugitive material, wherein the second layer of extruded filament is on the first layer of extruded filament and spans the first gap, and wherein the second layer of extruded filament forms a third passageway; and
a host encapsulating at least a portion of the first and second layers of extruded filament, wherein the host comprises an epoxy resin and the viscoelastic fugitive material comprises a shear yield stress $\tau_y$ of between about 0.7 Pa and about 1300 Pa.

21. The device of claim 20, wherein the viscoelastic fugitive material includes one or more viscosity modifiers at a concentration of less than 10% by weight.

22. The device of claim 21, wherein the one or more viscosity modifiers are selected from the group consisting of porous colloidal particles, calcium complex rods, lithium hydroxystearate fibers, liquid crystals, viscoelastic micelles, low molecular weight polymers, glass beads, polymer beads, polymer microcapsules, ceramic microcapsules, polymer, polymer fibers, ceramic fibers, and metal short fibers.

23. The device of claim 20, wherein the extruded filament comprises a co-extruded structure including an inner material and an outer material, one of the inner and outer materials comprising the viscoelastic fugitive material.

24. A microstructure comprising:
a host having a three-dimensional grid of substantially tubular hollow passageways and interconnects defined therein, a portion of the hollow passageways and interconnects being selectively sealed by a cured resin, such that only a non-sealed portion of the hollow passageways and interconnects within the host is in fluid communication,
where each hollow passageway has a diameter less than 1000 microns and is aligned in one of a series of stacked parallel planes, at least one hollow passageway in each plane being connected to at least one hollow passageway in an adjacent plane by one of the interconnects.

25. The microstructure of claim 24, wherein the non-sealed portion of the hollow passageways and the interconnects define a vertically-oriented, square-spiral mixing tower.

* * * * *